United States Patent [19]
Iijima et al.

[11] Patent Number: 5,995,706
[45] Date of Patent: Nov. 30, 1999

[54] SOUND EDITING APPARATUS

[75] Inventors: Yasuhiro Iijima; Naohisa Kawaguchi; Kazumi Saito, all of Kawasaki, Japan

[73] Assignee: Fujitsu Limited, Kawasaki, Japan

[21] Appl. No.: 07/955,803

[22] Filed: Oct. 2, 1992

[30] Foreign Application Priority Data

Oct. 9, 1991 [JP] Japan ..................................... 3-262070

[51] Int. Cl.$^6$ .............................. H04N 5/93; H04N 5/91
[52] U.S. Cl. ............................................... 386/54; 386/96
[58] Field of Search ..................................... 358/311, 341, 358/343; 360/19.1, 13, 14.1; 369/83, 86, 87; 386/52, 54, 55, 96, 95, 99, 102, 104, 39, 4; H04N 5/93, 5/91

[56] References Cited

U.S. PATENT DOCUMENTS

| | | | |
|---|---|---|---|
| 4,604,655 | 8/1986 | Moriyama | 358/343 |
| 4,703,369 | 10/1987 | Moriyama et al. | 358/343 |
| 4,792,974 | 12/1988 | Chace | 381/1 |
| 4,802,018 | 1/1989 | Tanikawa et al. | 358/335 |
| 4,868,687 | 9/1989 | Penn et al. | 360/13 |
| 4,965,675 | 10/1990 | Hori et al. | |

FOREIGN PATENT DOCUMENTS

WO 91/13497  9/1991  WIPO.

*Primary Examiner*—Robert Chevalier
*Attorney, Agent, or Firm*—Nikaido, Marmelstein, Murray & Oram LLP

[57] ABSTRACT

To visually display on a monitor screen the direction and volume of a sound source to be inserted in an image, a sound editing apparatus comprises a sound source direction setting unit for setting the sounding direction of a sound source; a sound source signal dividing unit for dividing a monaural sound source signal into left- and right-channel stereo signals according to the sounding direction of the sound source; a display unit for reproducing images from the video medium and displaying the images in which the sounds are to be inserted; and a sound source direction superimposing unit for superimposing a predetermined mark, which indicates the sounding direction, in the video images displayed on the display unit.

5 Claims, 26 Drawing Sheets

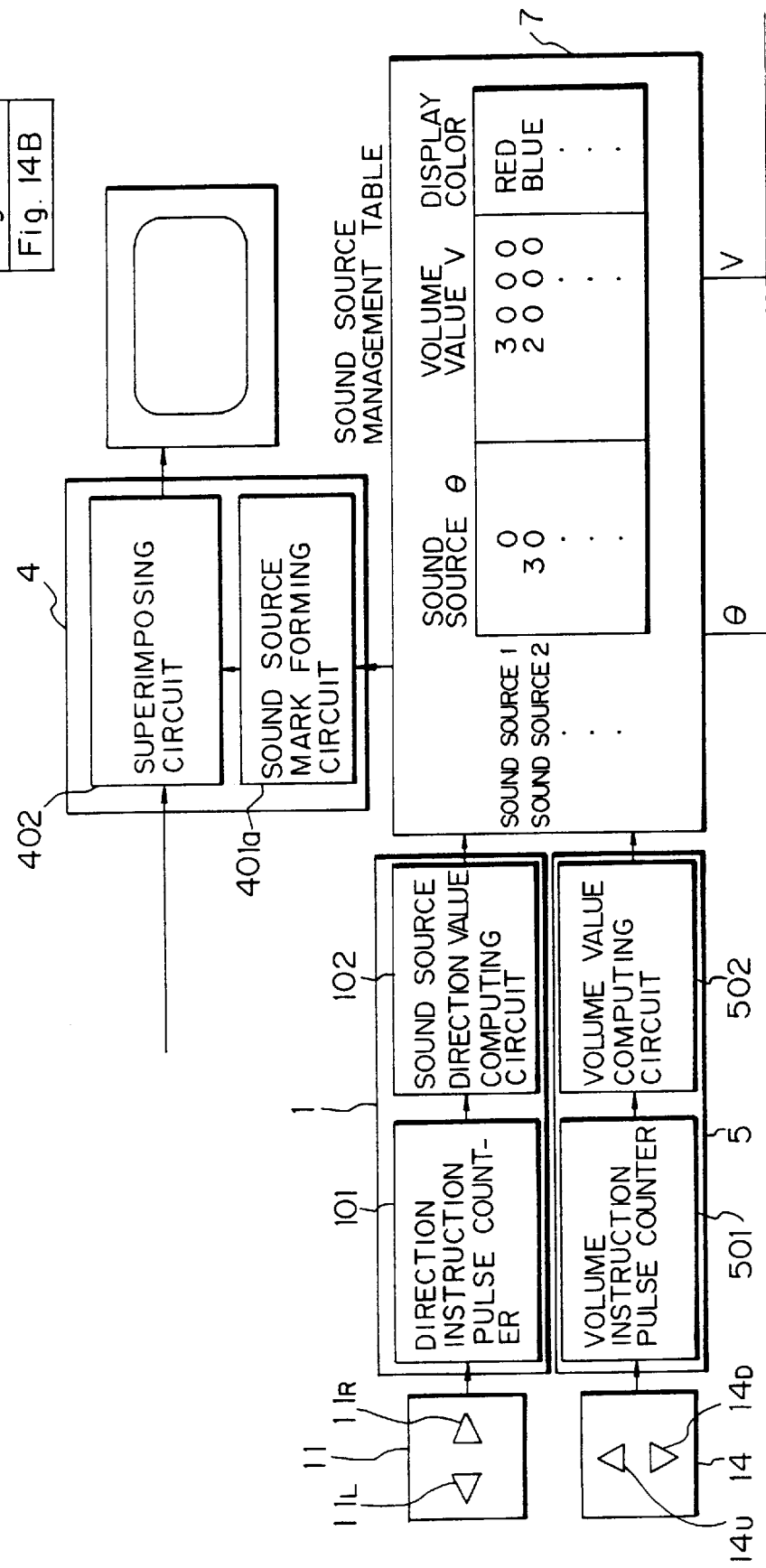

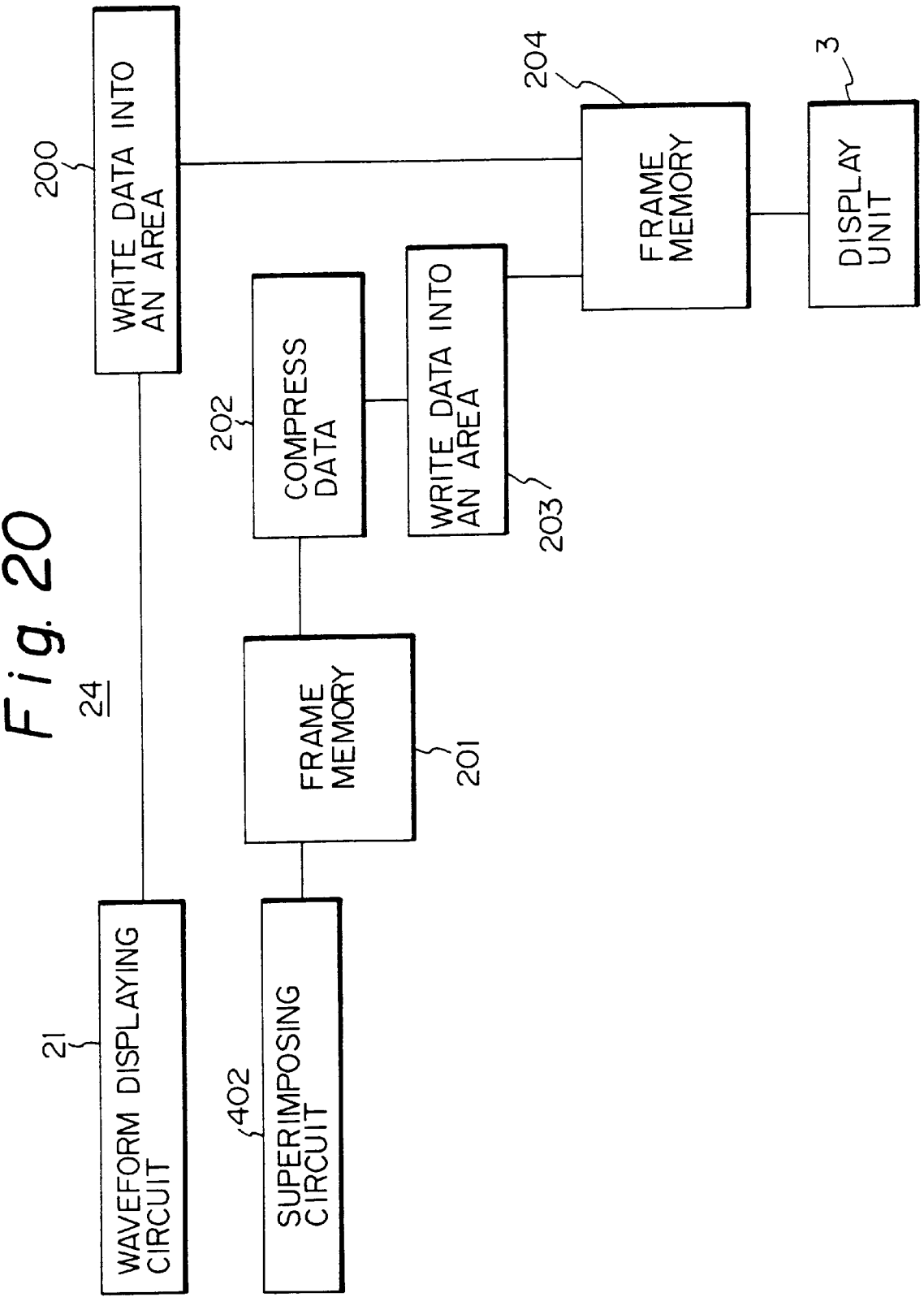

SOUND EDITING APPARATUS

BACKGROUND OF THE INVENTION

1. Filed of the Invention

The present invention relates to a sound editing apparatus employed for making videos, television broadcasting programs, movies, computer animations, multimedia software, game software, etc., to insert sounds in video media by after-recording.

Portable videos and 8-mm video cameras are popular these days, enabling anyone to easily record images and make animated presentations. To record images more correctly and impressively, it is preferable to record sounds together with the images. The after-recording technique is one of the popular techniques used for recording sounds. The after-recording technique inserts proper sounds and music in scenes of a recorded video medium afterwards.

2. Description of the Related Art

A conventional sound editing work employs a sound editing apparatus called a mixer and manually edits sounds from the beginning to the end.

The conventional sound editing technique adjusts the position and volume of a sound source according to the hearing sense of a mixing engineer, so that the mixing engineer must be skilled in hearing sound. The sound editing work, therefore, is not easy work that can be done by anyone.

While monitoring images, the engineer must edit sounds in real time and on-line and precisely consider the kinds and timing of sounds to be inserted in the images. During the sound insertion, the engineer must correctly operate many control knobs and switches and that requires skill.

In addition, to guarantee the highest sound quality on a completed work, the monitoring equipment and devices must be of top quality. This increases costs.

SUMMARY OF THE INVENTION

To solve these problems, an object of the invention is to provide a sound editing apparatus for visually displaying the position and volume of a sound source which is to be inserted in an image, so that anyone may easily and correctly edit sounds with no skill.

To attain the above object, there is provided, according to the present invention, a sound editing apparatus for inserting sounds in a video medium by after-recording, comprising: a sound source direction setting unit for setting the sounding direction of a sound source according to a sound source direction instruction input; a sound source signal dividing unit for dividing a monaural sound source signal into left- and right-channel stereo signals according to the direction of the sound source set by the sound source direction setting unit; a display unit for reproducing images from the video medium and displaying the images in which the sounds are to be inserted; and a sound source direction superimposing unit for superimposing a predetermined mark, which indicates the sounding direction of the sound source set by the sound source direction setting unit, on the images displayed on the display unit.

According to another aspect of the present invention, the sound editing apparatus further comprises: a volume setting unit for setting the volume of the sound source according to a volume instruction input; and a volume superimposing unit for adjusting the condition of the sound source mark displayed on the display unit, according to the set volume.

According to still another aspect of the present invention, the sound editing apparatus further comprises: a sound source managing table for storing information about the positions and volumes of a plurality of sound sources, sounds from the sound sources being edited according to the information stored in the sound source managing table.

According to still further aspect of the present invention, in a sound editing, apparatus the sound source managing table involves a section specifying region for storing information specifying a video section in which sounds are to be inserted, and a section managing unit for writing a video section in which sounds are inserted into the section specifying region according to a section specifying input, a video section in which sounds of a plurality of sound sources are to be inserted being specified, and the timing of inserting the sounds being scheduled on the display unit.

BRIEF DESCRIPTION OF THE DRAWINGS

The above object and features of the present invention will be more clearly understood from the following description of the preferred embodiments with reference to the drawings, wherein

FIG. 14 including FIG. 14A

FIG. 20 is a view showing in detail the display data forming process 24 in FIG. 18;

DESCRIPTION OF THE PREFERRED EMBODIMENTS

For better understanding of the present invention a conventional sound editing technology is first described.

Figure 23:
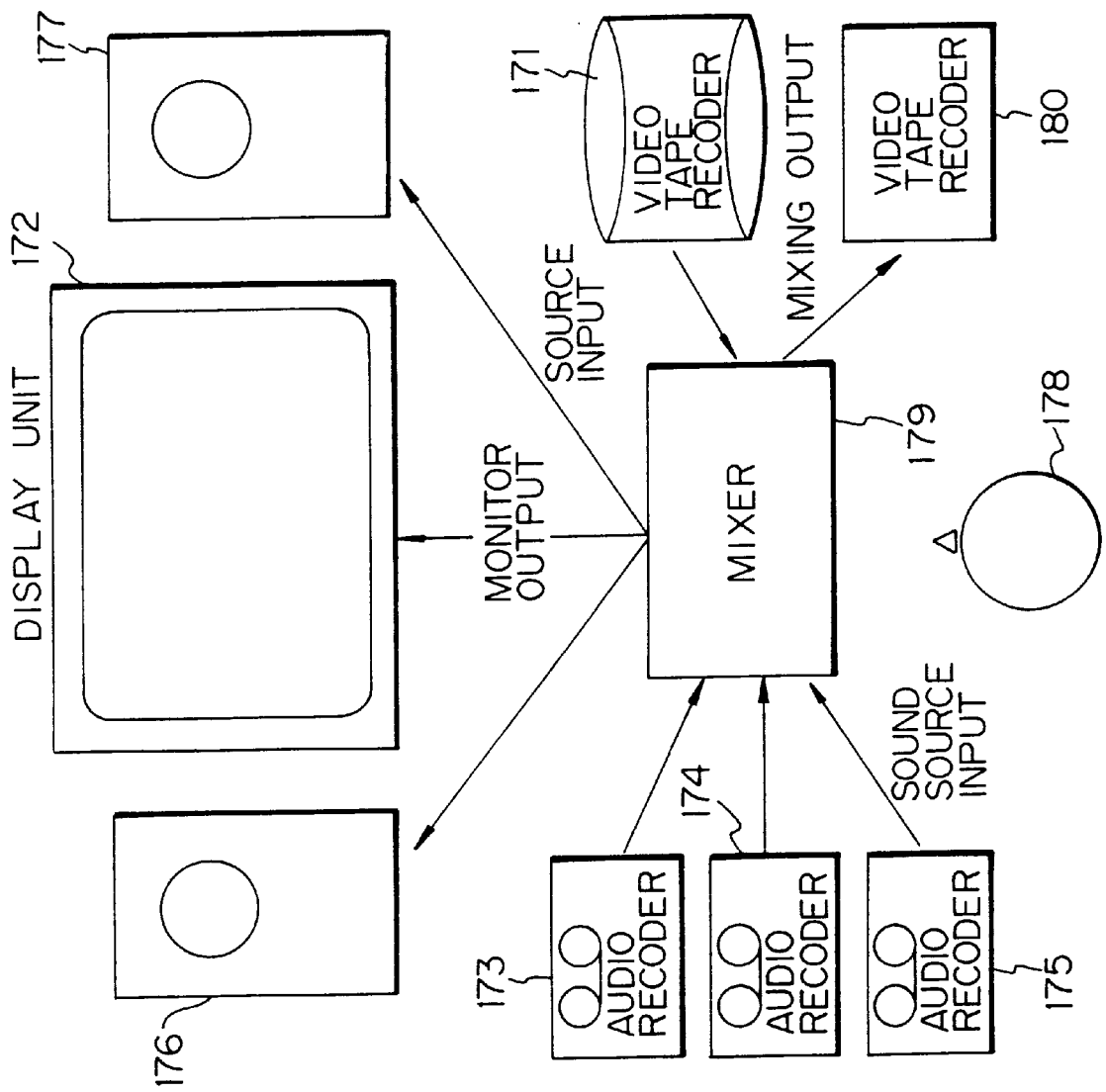
FIG. 23 is a view showing a prior art.

Conventional sound editing employs a sound editing apparatus called a mixer and manually edits sounds from the beginning to the end. FIG. 23 shows an example of the conventional editing apparatus. A video tape recorder 171 reproduces images in which sounds are to be inserted, and a display unit 172, (i.e., a monitor television, displays the reproduced images. While monitoring the images, a mixing engineer reproduces recorded voices, sounds, music, etc., on audio recorders 173 to 175 to hear the sounds through speakers 176 and 177. The engineer operates a mixer 179 to insert the sounds and record the sounds and images on a video tape recorder 180.

Figure 24:
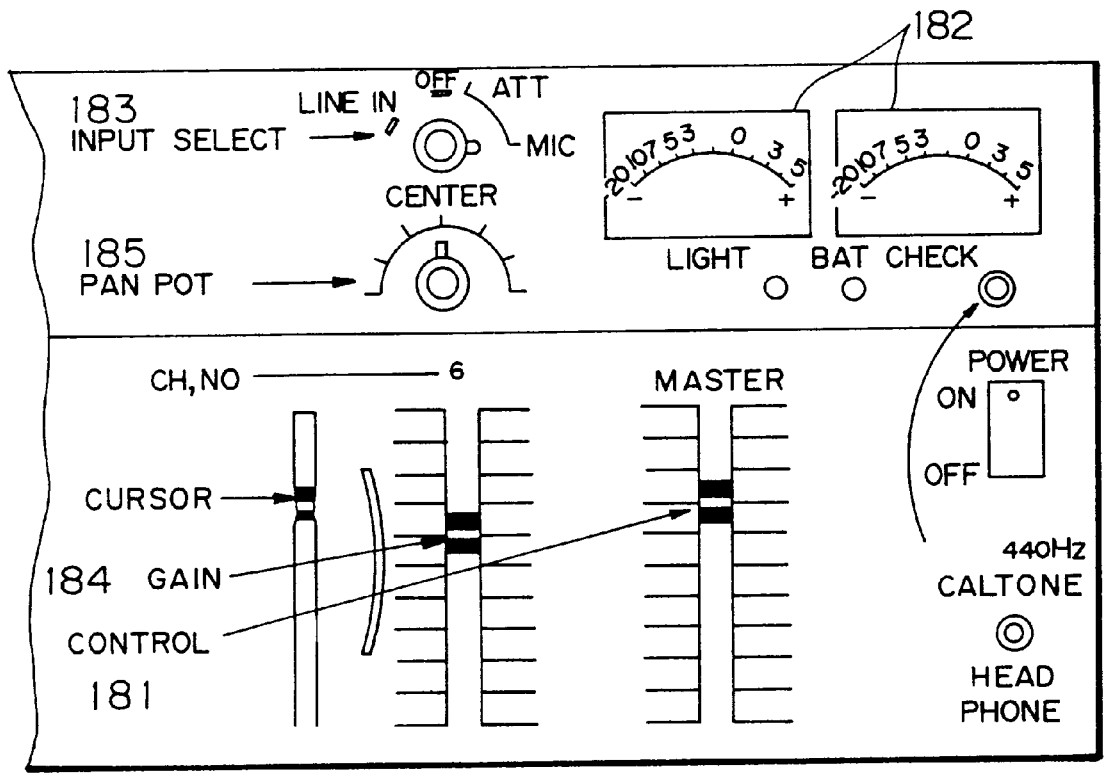
FIG. 24 is a view showing an example of a display panel of a conventional mixer.
Figure 25:
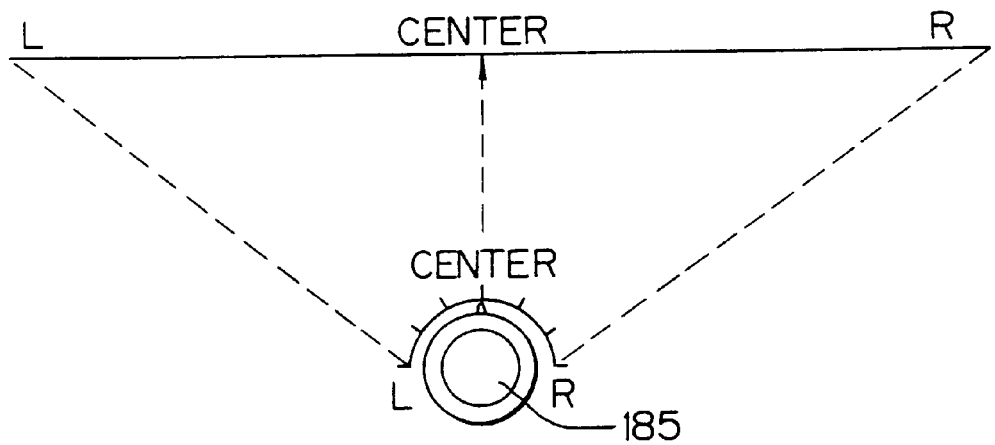
FIG. 25 is an explanatory view showing a direction setting operation of a sound source carried out with a panning potentiometer.

FIG. 24 shows part of a control panel of the mixer 179. The mixer 179 involves many control knobs and switches such as a master volume 181 for adjusting the volume of a final output, a volume meter (VU meter) 182 for indicating the volumes of left and right sounds, an input selector 183 for selecting sound sources to be subjected to the after-recording, a channel gain 184 for setting the volume of a selected sound source, and a panning positioner 185 for determining a mixing ratio (a sounding direction) of the sound source to be inserted to prepare left and right stereo channels. To edit sounds, the mixing engineer sets necessary sounds to respective channels through the input selector 183, sets the gains of the sound sources of the channels through the channel gain 184, and moves the sounding direction of a sound image of the sounds to be inserted by turning the panning positioner 185 between L (left) and R (right), as shown in FIG. 25, thereby settling the sounding direction of the sound source on a corresponding image.

The above-mentioned conventional sound editing technique has various problems as described before.

The conventional sound editing technique adjusts the position and volume of a sound source according to the hearing sense of a mixing engineer, so that the mixing engineer must be skilled in hearing sound. The sound editing work, therefore, is not easy work that can be done by anyone.

While monitoring images, the engineer must edit sounds in real time and on-line and precisely consider the kinds and timing of sounds to be inserted in the images. During the sound insertion, the engineer must correctly operate many control knobs and switches and that requires skill.

In addition, to guarantee the highest sound quality on a completed work, the monitoring equipment and devices must be of top quality. This increases costs.

To solve these problems, the present invention provides a new sound editing apparatus for visually displaying the position and volume of a sound source which is to be inserted in an image, so that anyone may easily and correctly edit sounds with no skill.

Embodiments of the present invention will described below.

Figure 1:
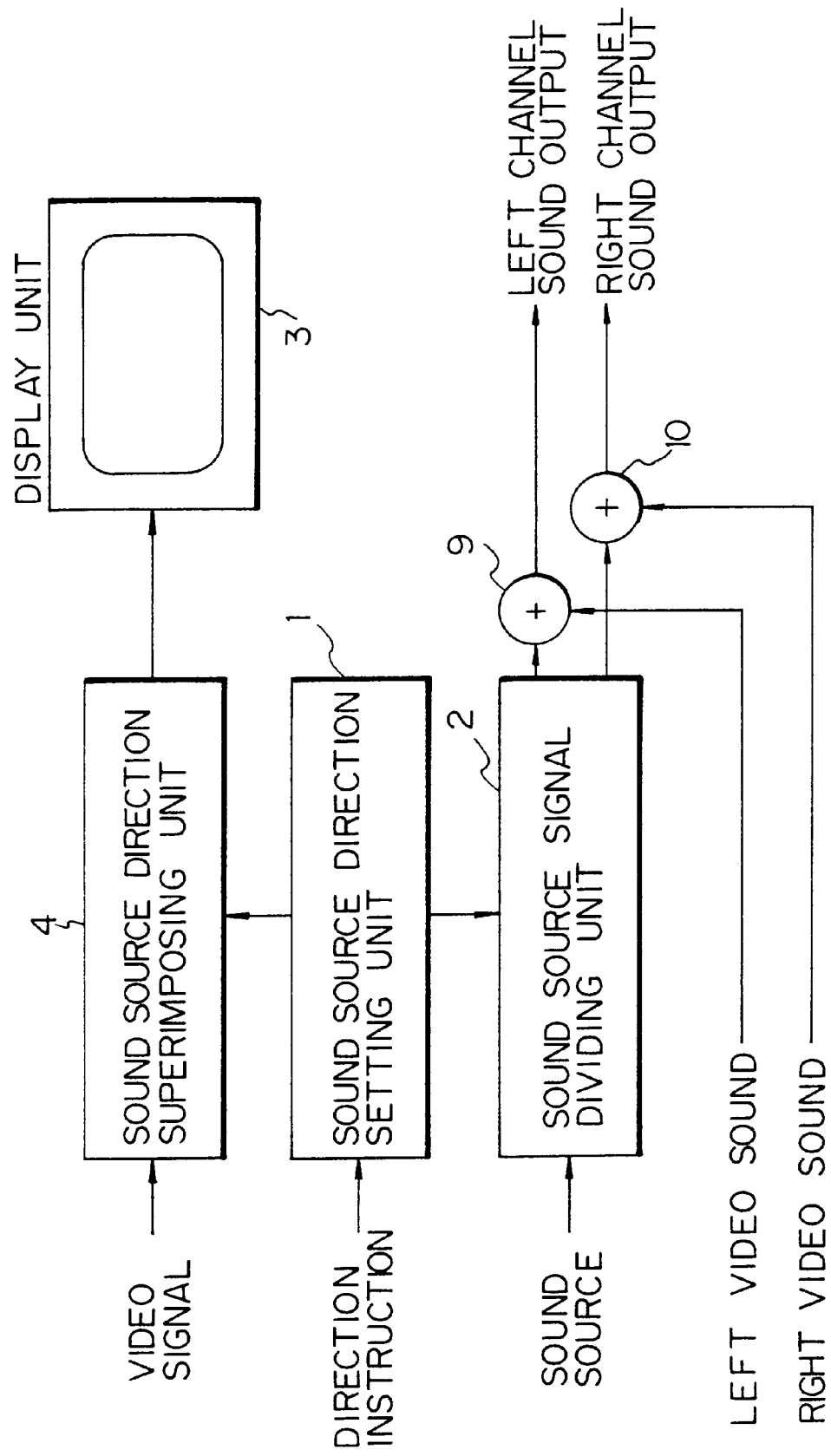
FIG. 1 is a view showing the principle of the first embodiment of the present invention.

FIG. 1 shows the principle of a first embodiment of the present invention. The first embodiment visually displays on a screen the sound generating direction of a sound source to be inserted in an image, to edit sounds. The first embodiment employs a sound source direction setting unit 1 for setting the sounding direction of a sound source according to a sound source direction instruction input; a sound source signal dividing unit 2 for dividing a monaural sound source signal into left- and right-channel stereo signals according to the sounding direction of the sound source set by the sound source direction setting unit 1; a display unit 3 for reproducing images from a video medium and displaying the images in which sounds are to be inserted; and a sound source direction superimposing unit 4 for superimposing a predetermined mark, which indicates the sounding direction of the sound source set by the sound source direction setting unit 1, on the video images displayed on the display unit 3.

Figure 2:
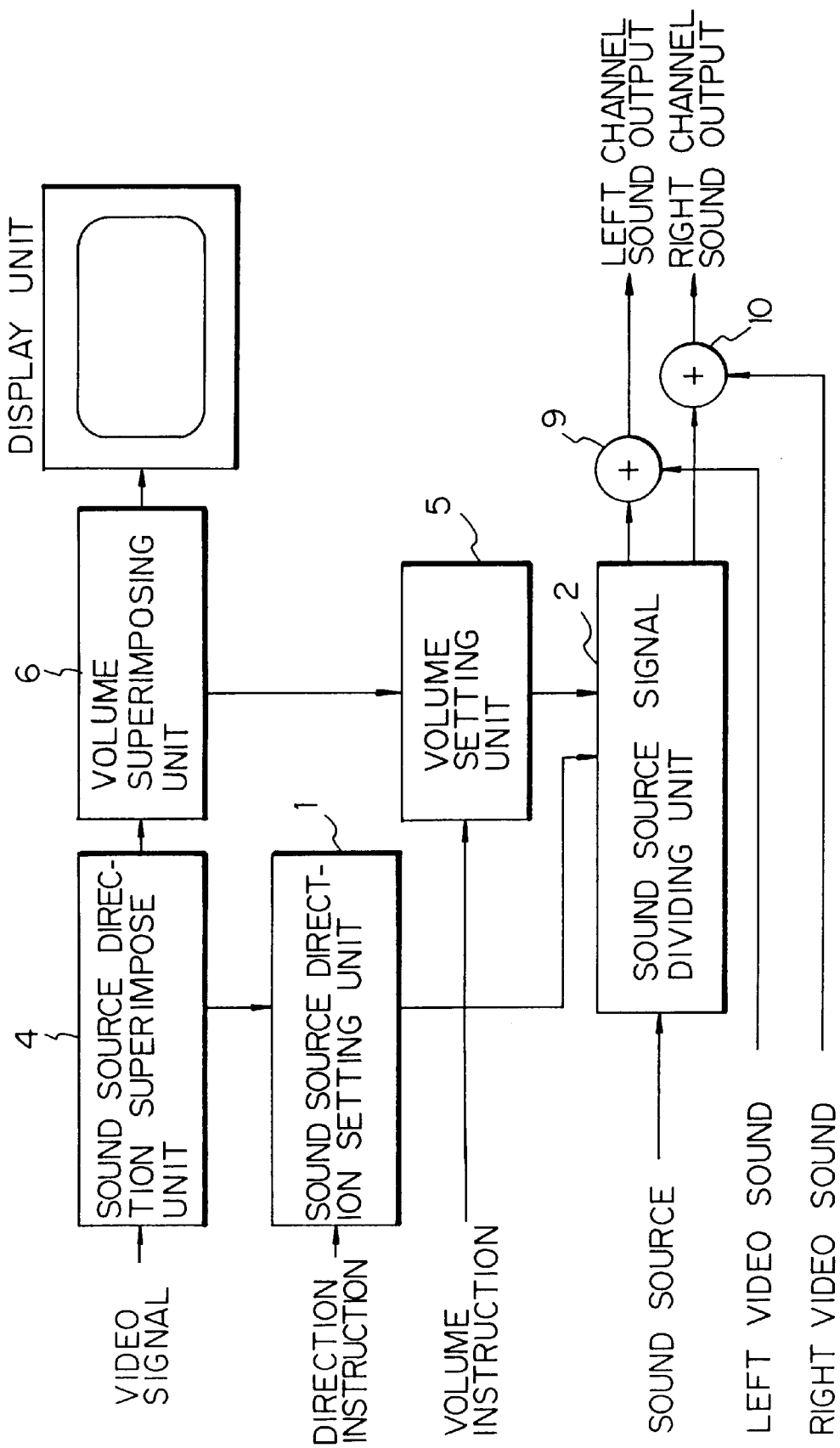
FIG. 2 is a view showing the principle of the second embodiment of the present invention.

FIG. 2 shows the principle of a second embodiment of the present invention. The second embodiment visually displays not only the sounding direction of a sound source to be inserted in an image but also the volume of the sound source. Based on the sound editing apparatus of the first invention, the second embodiment further employs a volume setting unit 5 for setting the volume of the sound source according to a volume instruction input; and a volume superimposing unit 6 for adjusting the condition of the sound source mark displayed on the display unit, according to the set volume.

Figure 3:
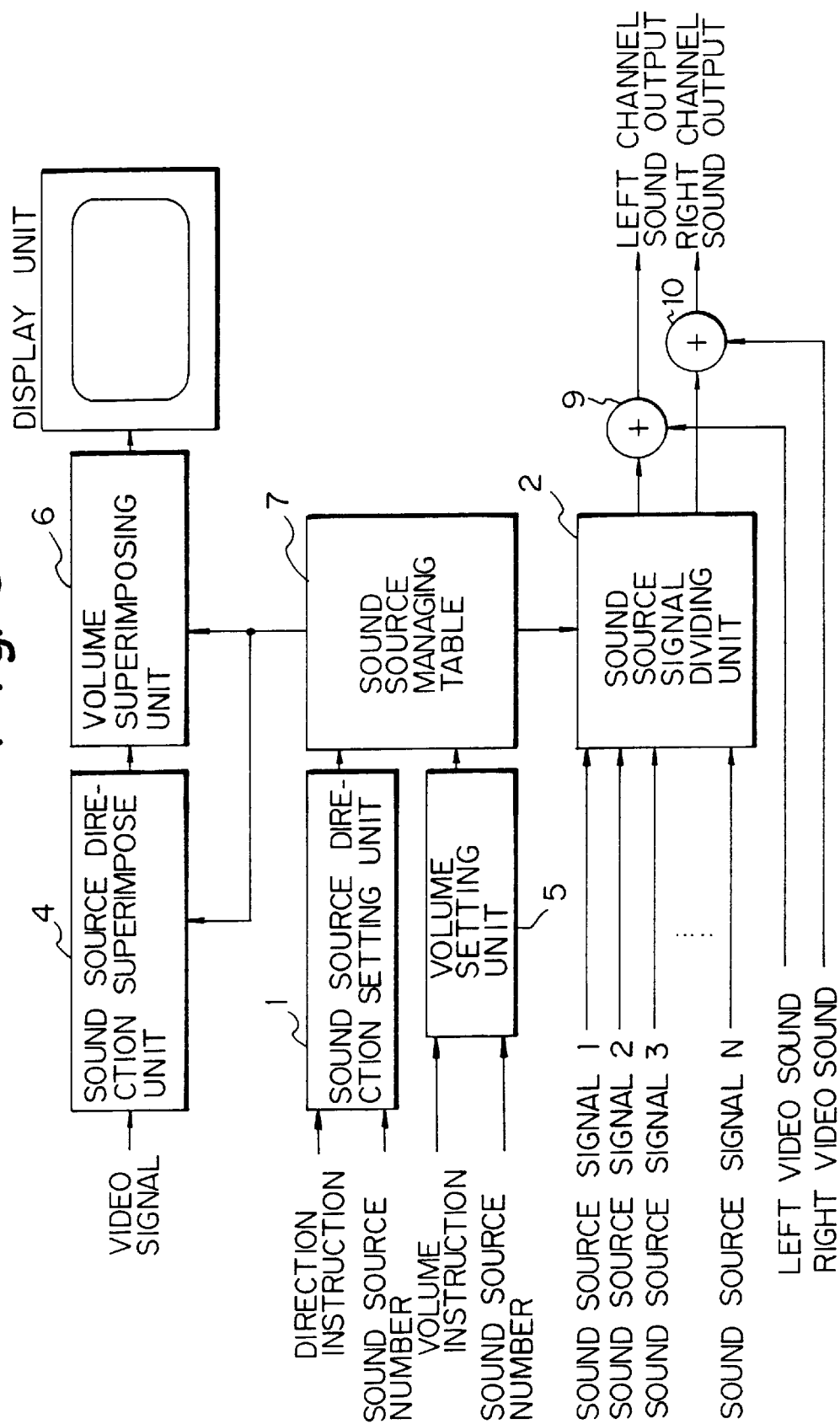
FIG. 3 is a view showing the principle of the third embodiment of the present invention.

FIG. 3 shows the principle of a third embodiment of the present invention. The third embodiment visually displays the positions and volumes of a plurality of sound sources. Based on the sound editing apparatus of the first or second embodiment, the third embodiment further employs a sound source managing table 7 for storing information about the positions and volumes of a plurality of sound sources. The sounds of the sound sources are edited according to the information stored in the table 7.

Figure 4:
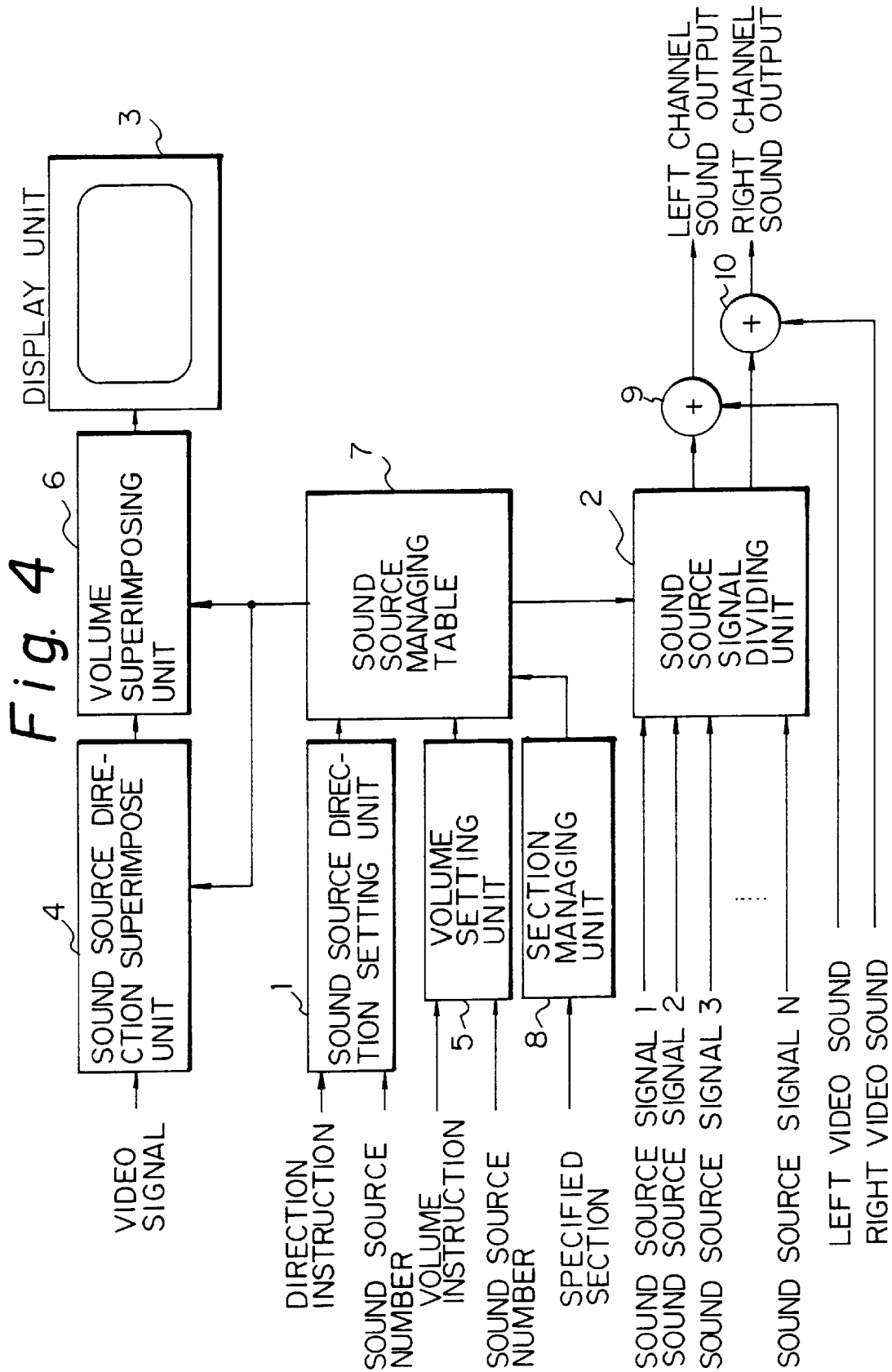
FIG. 4 is a view showing the principle of the fourth embodiment of the present invention.

FIG. 4 shows the principle of a fourth embodiment of the present invention. According to the fourth embodiment, the sound source managing table 7 of the third embodiment has a section specifying region for storing information for specifying a video section in which sounds are inserted, and a section managing unit 8 for writing a video section in which sounds are inserted into the section specifying region according to a section specifying input. The fourth embodiment specifies a video section in which sounds of a plurality of sound sources are inserted, and prepares schedules on the display unit showing the timing of inserting the sounds.

According to the first embodiment, a video source sends a video signal, which is passed through the sound source direction superimposing unit 4 to the display unit 3, which displays an image. A mixing engineer monitors the image and operates a keyboard to enter an instruction indicating the sounding direction of a sound source. Then, the sound source direction setting unit 1 determines the sounding direction of the sound source to be inserted in the image, according to the instruction. The resultant sound source direction data is sent to the sound source direction superimposing unit 4 and to the sound source signal dividing unit 2.

According to the sound source direction data, the sound source direction superimposing unit 4 superimposes a sound source mark, such as a vertical line having a predetermined color, at the position of the sound source on the image presently displayed on the display unit 3. Accordingly, the mixing engineer may determine the sounding direction of the sound source to be inserted in the image while monitoring the sound image of the sound source on the displayed image.

According to the sound source direction data provided by the sound source direction setting unit 1, the sound source signal dividing unit 2 divides a monaural sound source signal into left- and right-channel stereo signals according to a ratio determined by the sound source direction. Accordingly, the mixing engineer can easily insert sounds in the image by moving the sound source mark just over a displayed object while monitoring the image on the display unit 3.

If a video source to be reproduced incorporates sound signals recorded together with images, other than sound source signals to be inserted in the images, the divided left- and right-channel sound source signals are added to the left and right sound signals incorporated in the image source by adders 9 and 10, to provide final stereo signals.

The second embodiment uses not only the sounding direction but also the volume of a sound source. According to a sound volume instruction input, the sound volume setting unit 5 determines the absolute volume of a sound source to be inserted in an image and provides the sound volume information to the volume superimposing unit 6 and to the sound source signal dividing unit 2.

According to the volume information, the volume superimposing unit 6 changes the condition such as the width of a sound source mark prepared by the sound source direction superimposing unit 4. Namely, the sound source mark displayed on the display unit 3 changes its display condition in response to the set volume.

According to the volume information of the sound source provided by the volume setting unit 5, the sound source signal dividing unit 2 adjusts the absolute volume of the sound source signal, and divides the sound source signal into left- and right-channel stereo signals according to a ratio corresponding to the sounding direction of the sound source. In this way, sounds are inserted in images while visually confirming not only the sounding direction but also the volume of a sound.

According to the third embodiment, the sound source managing table 7 stores the directions and volumes of a plurality of sound sources. The sound source signal dividing unit 2, sound source direction superimposing unit 4, and volume superimposing unit 6 refer to the sound source data stored in the sound source managing table 7, to simultaneously control the sound sources. Accordingly, the directions and volumes of the sound sources can simultaneously be confirmed on the display unit when inserting sounds in images.

The fourth embodiment writes, into a section specifying region, information for specifying a video section in which sounds are to be inserted as well as information about the directions and volumes of sound sources. After specifying a video section in which sounds are to be inserted, the timing of inserting sounds of the sound sources is scheduled on the display unit.

Figure 5:
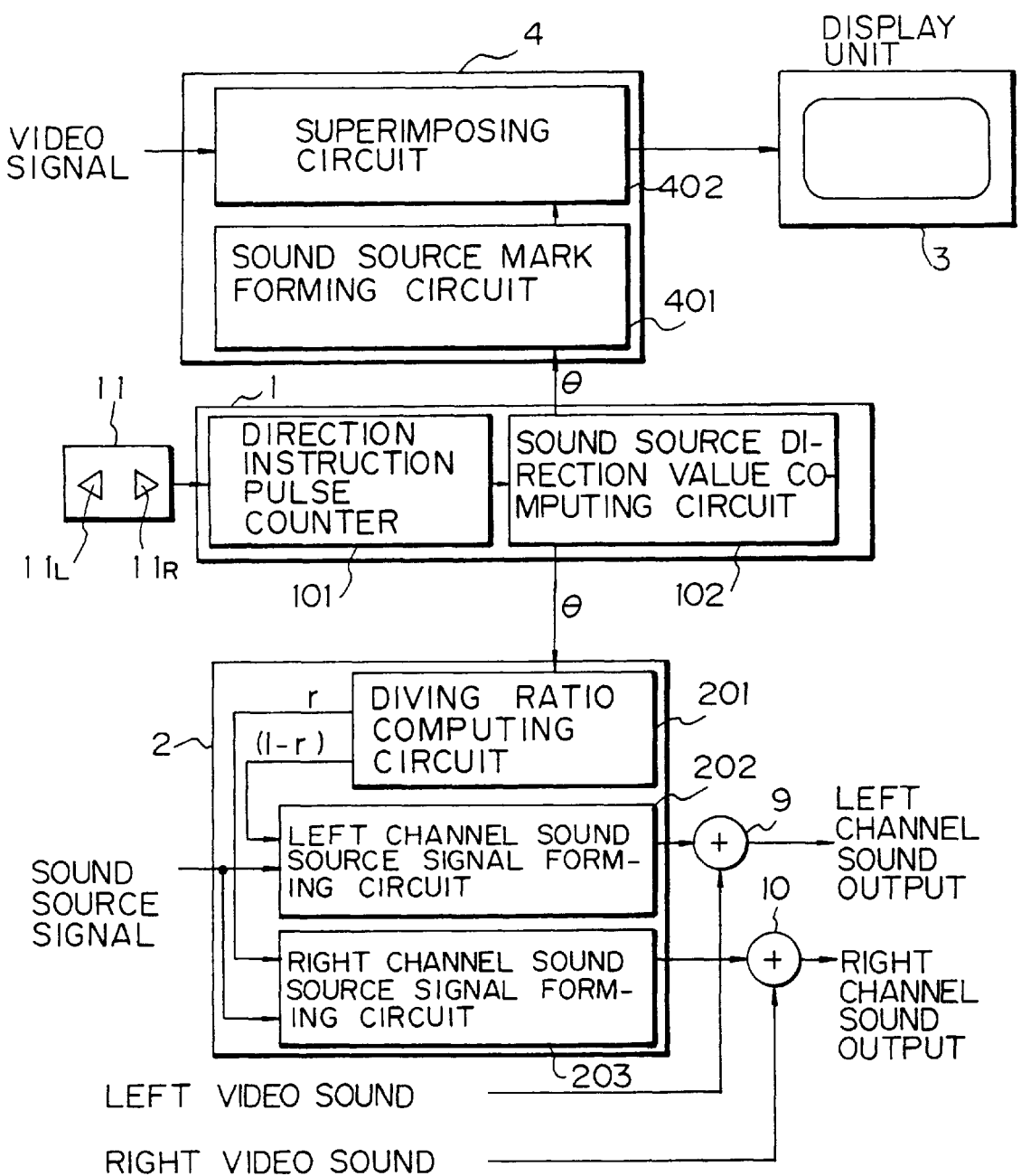
FIG. 5 is a view showing in detail the first embodiment of the present invention.

FIG. 5 shows the first embodiment in detail. In the figure, a sound source direction setting unit 1 comprises a direction instruction pulse counter 101 for counting positive and negative direction instruction pulses provided by a direction instruction key 11, and a sound source direction value computing circuit 102 for setting a sound source direction value θ according to the number of the counted pulses.

The direction instruction key 11 comprises a left button 11L and a right button 11R. While the left button 11L is being pushed, left pulses are provided one after another. While the right button 11R is being pushed, right pulses are successively provided.

The sound source direction value computing circuit 102 increments the sound source direction value θ by one when the direction instruction pulse counter 101 counts a right pulse, and decrements the sound source direction value θ by one when a left pulse is counted, thereby setting the sound source direction value θ for determining the sounding direction of the sound source according to an instruction provided through the direction instruction key 11. The sound source direction value θ is 0 for the center (true front), negative toward the left, −90 degrees for true left, positive toward the right, and +90 degrees for true right.

The sound source direction superimposing unit 4 comprises a sound source mark forming circuit 401 and a superimposing circuit 402 for superimposing a sound source mark prepared by the sound source mark forming circuit 401 and visually displaying the mark on a screen.

Figure 10:
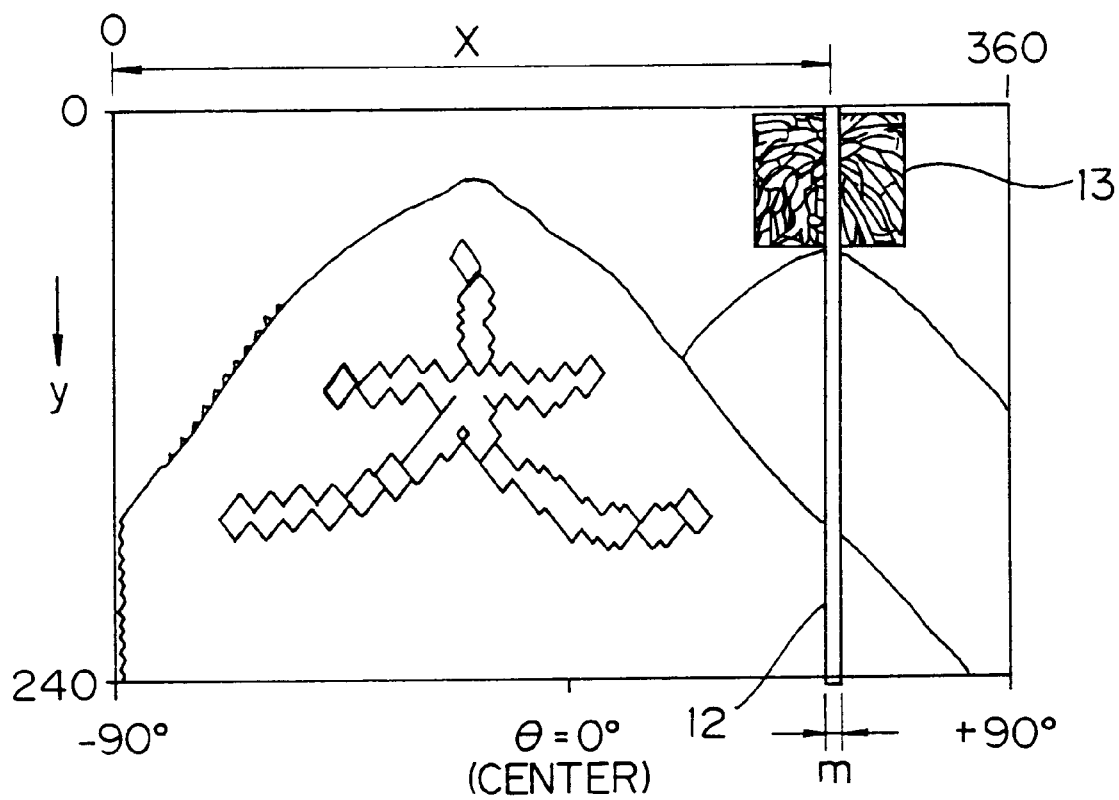
FIG. 10 is a view showing an example of an image displayed on a monitor screen.

The sound source mark forming circuit 401 receives the sound source direction value θ from the sound source direction value computing circuit 102, converts the value into a coordinate x representing a horizontal distance on the screen of the display unit 3, and prepares a sound source mark 12, which is, for example, a vertical line extending from the top to the bottom of the screen as shown in FIG. 10. The superimposing circuit 402 superimposes the sound source mark 12 on a video signal, to display the sound and image on the display unit 3.

The sound source signal dividing unit 2 comprises a dividing ratio computing circuit 201 for computing a dividing ratio of a sound source signal into left and right channels, a left channel sound source signal forming circuit 202 for forming a left channel sound source signal, and a right channel sound source signal forming circuit 203 for forming a right channel sound source signal.

Figure 6:
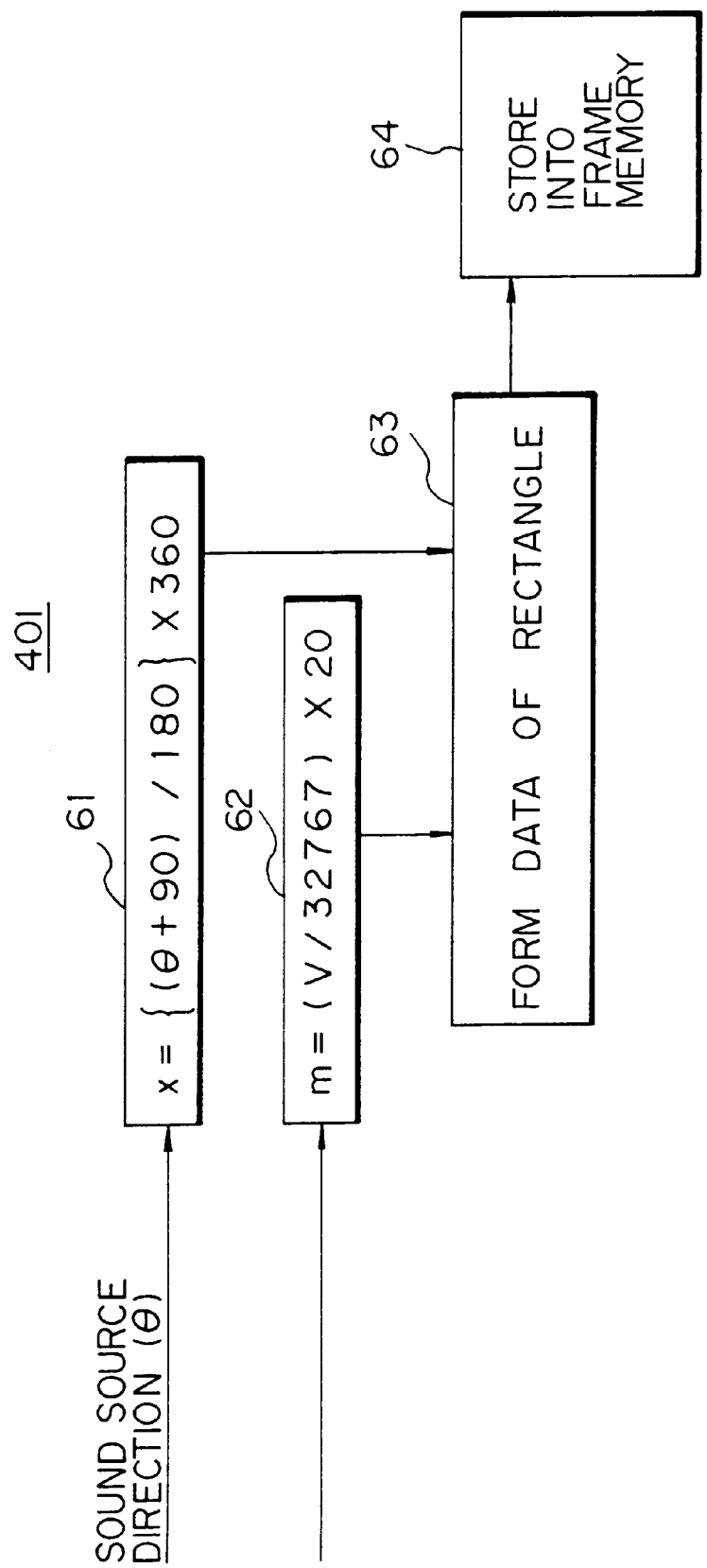
FIG. 6 is a view showing the process in the sound source mark forming circuit 401 in FIG. 5.

The operation in the sound source mark forming circuit 401 in FIG. 5 is explained with reference to FIG. 6, wherein at step 61, the sound source direction value θ is converted to the coordinate X by an equation:

$$X=\{(\theta+90)/180\}\times 360$$

It should be noted that the size of one picture is 360 dots in the horizontal direction. At step 62, the volume value V is converted to the line width m of the sound source mark by an equation.

$$m=(V/32767)\times 20$$

It should be noted that the maximum volume is 32767 (16 bits). At step 63, data of a rectangle having four corners (x, 0), (x, 240), (x+m, 240), (x+m, 0) is formed. At step 64, the data is stored in a frame memory.

Instead of calculating the line width m, the line width may be a constant value regardless of the volume value.

The operation of the superimposing circuit 402 in FIG. 5 is explained with reference to FIG. 7, wherein at steps 71, 72, and 73, a vertical synchronization signal, a horizontal synchronization signal, and a picture signal are respectively separated from an input video signal. At step 74, picture signals of one picture are stored in a frame memory. Based on the vertical synchronization signal and the horizontal synchronization signal, at step 75, a horizontal line of a picture signal to be read is determined. At step 76, a picture signal of the determined horizontal line is generated. At step 77, the picture signal separated at step 73 and the picture signal generated at step 76 are superimposed. At steps 78 and 79, the horizontal synchronization signal and the vertical synchronization signal are respectively synthesized with the superimposed signal. Thus, the output video signal is obtained.

Figure 7:
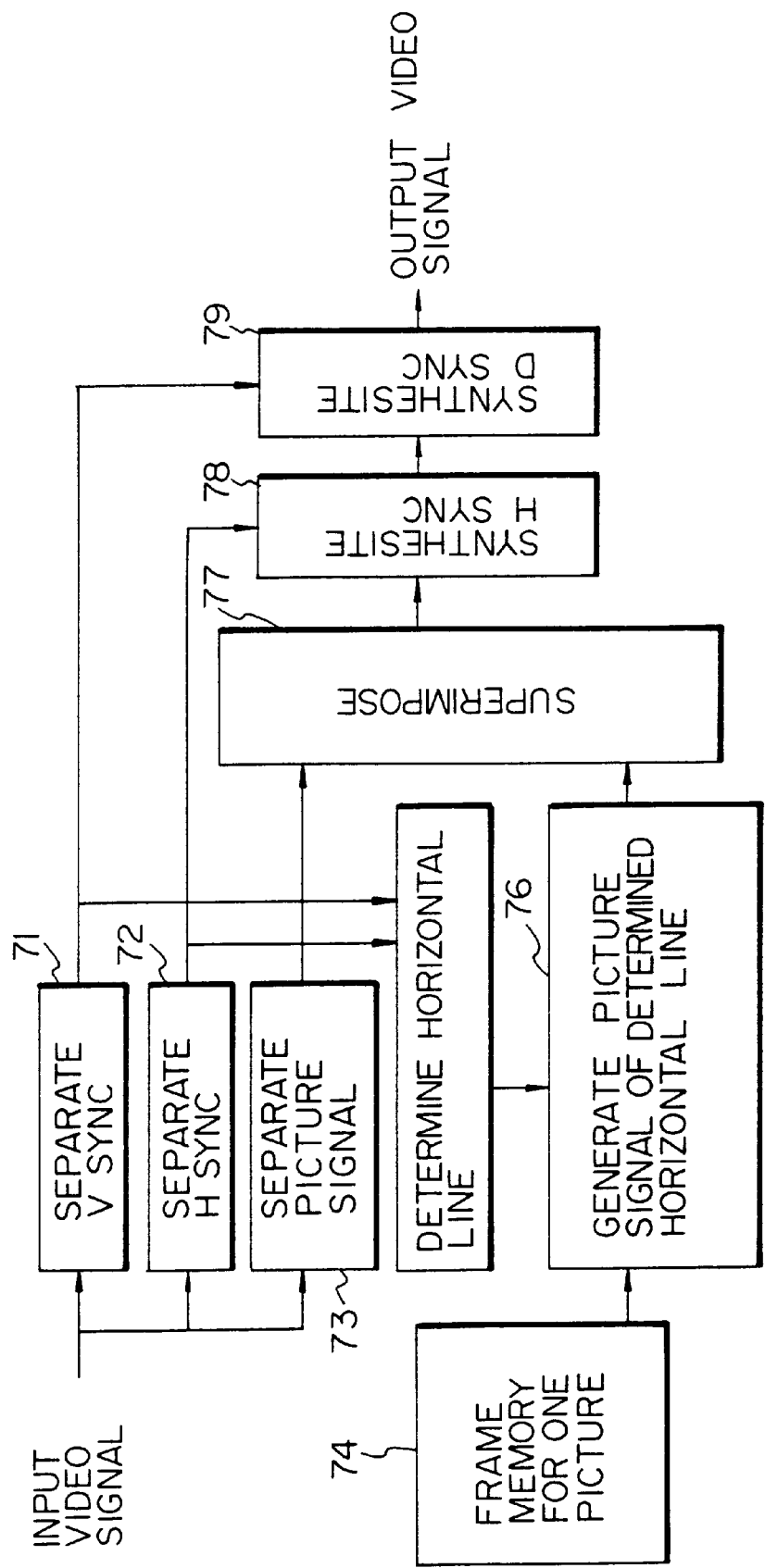
FIG. 7 is a view showing an example of the process in the superimposing circuit shown in FIG. 5.
Figure 8:
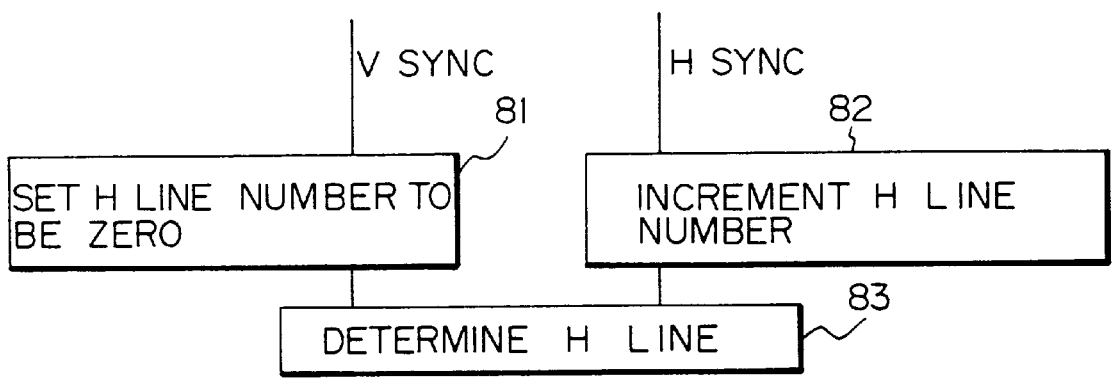
FIG. 8 is a view showing in detail the process 75 in FIG. 7.

FIG. 8 is a diagram explaining the operation of determining the horizontal line of step 75 in FIG. 7. In FIG. 8, at step 81, in response to a vertical synchronization signal, the number of the horizontal synchronization line is set to zero. At step 82, in response to the horizontal synchronization signal, the number of the horizontal synchronization line is incremented. At step 83, the number of the horizontal line of the sound source mark to be displayed is determined.

Figure 9:
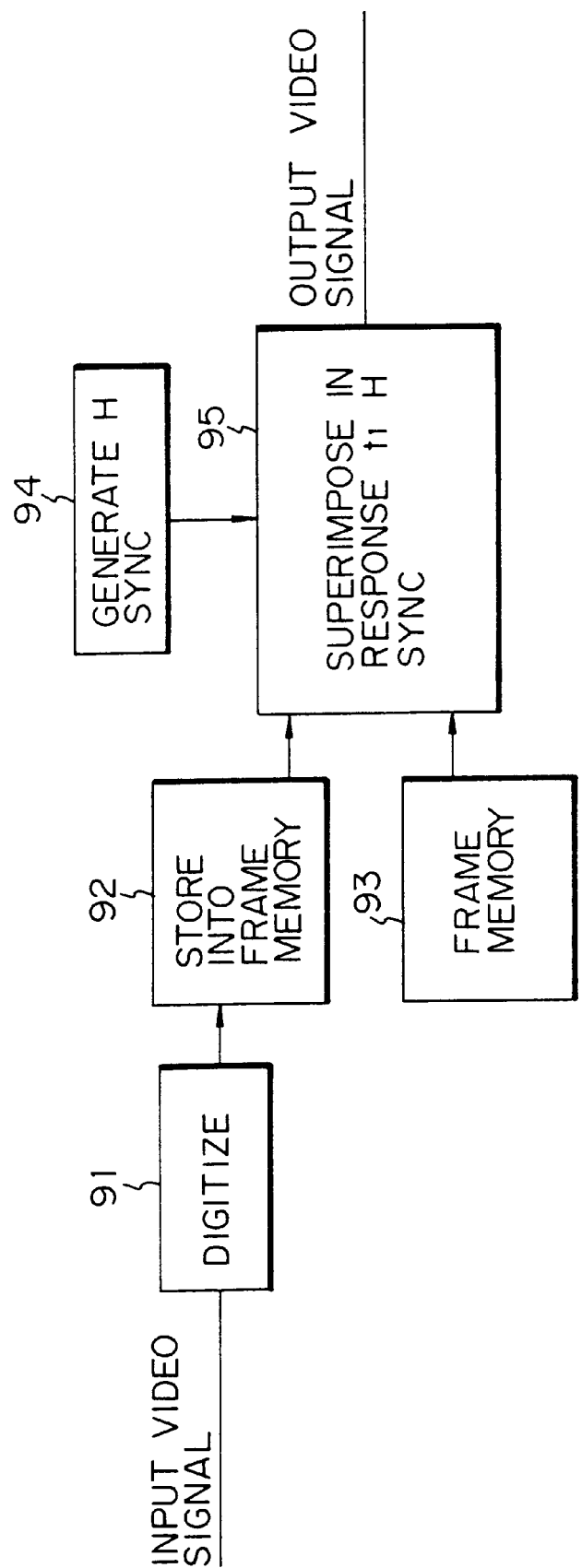
FIG. 9 is a view showing another example of the process in the superimposing circuit in FIG. 5.

FIG. 9 is a diagram explaining another example of the operation of the superimposing circuit 402 in FIG. 5. In FIG. 9, the operation is effected as a digital processing. At step 91, the input video signal is digitized. At step 92, the digitized video signal is stored in a frame memory. At step 93, the data of the sound source mark is stored in a frame memory. At step 94, the vertical synchronization signal is generated. At step 95, in response to the vertical synchronization signal, the data of the sound source mark is superimposed on the image data. Thus, the output video signal is obtained.

As an example of the embodiment of FIG. 5, FIG. 10 shows an image of "Daimonji burning and fireworks" known as a famous festival in Kyoto, Japan. In FIG. 10, numeral 12 denotes a sound source mark representing the sounding direction of a sound source inserted in the image, and 13 is an image of the fireworks.

A video tape recorder (not shown) reproduces the image of the "Daimonji burning and fireworks" shown in FIG. 10 and displays the image on the display unit 3. A mixing engineer monitors the displayed image of "Daimonji burning and fireworks" of FIG. 9 and operates the direction instruction key 11 so that the sound source mark 12 comes just on the fireworks 13 on the screen.

In FIG. 10, the fireworks 13 are on the right side of the center, so that the mixing engineer pushes the right button 11R of the direction instruction key 11. While the right button 11R is being pushed, right pulses are successively provided. The direction instruction pulse counter 101 counts the pulses and provides a count signal to the sound source direction value computing circuit 102.

Whenever receiving a pulse count from the direction instruction pulse counter 101, the sound source direction value computing circuit 102 increments the sound source direction value θ by, for example, +1 degree. The sound source direction value θ thus obtained is sent to the sound source mark forming unit 401.

The sound source mark forming circuit 401 normalizes a left end of the display screen as a coordinate x=0, as shown in FIG. 10, and computes a horizontal coordinate x on the screen according to the sound source direction value θ and the following equation with the screen size of the display unit 3 being 360 dots in the horizontal direction and 240 dots in the vertical direction:

$x=\{(\theta+90)/180\}\times 360$ (dots)

According to the computed coordinate x, the sound source mark forming circuit 401 draws a straight line having a predetermined width from a point (x, 0) to a point (x, 240) with a left upper corner of the screen being an original point (0, 0), thereby forming the sound source mark 12, which is a vertical line extending between the top and the bottom of the screen. In this case, the step 62 in FIG. 6 is omitted but the straight line has the above-mentioned predetermined width. The superimposing circuit 402 superimposes the sound source mark 12 thus formed over the image signal and displays them on the screen of the display unit 3.

When the sound source mark 12 is positioned just on the fireworks 13 by manipulating the direction instruction key 11, the mixing engineer starts an audio recorder (not shown) to reproduce sounds of the fireworks previously recorded and insert the sounds in the image.

The sound source direction value θ provided by the sound source direction value computing circuit 102 is sent not only to the sound source mark forming circuit 401 but also to the dividing ratio computing circuit 201. Upon receiving the sound source direction value θ, the dividing ratio computing circuit 201 normalizes true left to 0 degrees by adding 90 degrees to the sound source direction value θ, and computes a right channel dividing ratio r of the sound source signal according to the following equation:

$r=(\theta+90)/180$

The right channel dividing ratio r thus obtained will be in a range of from 0 to 1 depending on the value θ (θ being among −90 to +90 degrees). A left channel dividing ratio of the sound source signal will be (1−r).

The dividing ratio computing circuit 201 provides the right channel dividing ratio r to the right channel sound source signal forming circuit 203 and the left channel dividing ratio (1−r) to the left channel sound source signal forming circuit 202.

The right channel sound source signal forming circuit 203 multiplies a monaural sound source signal by the right channel dividing ratio r to form a right channel sound source signal, and by the left channel dividing ratio (1−r) to form a left channel sound source signal, thereby providing left and right stereo signals as follows:

right channel sound source signal=sound source signal×r left channel sound source signal=sound signal×(1−r)

Figure 11:
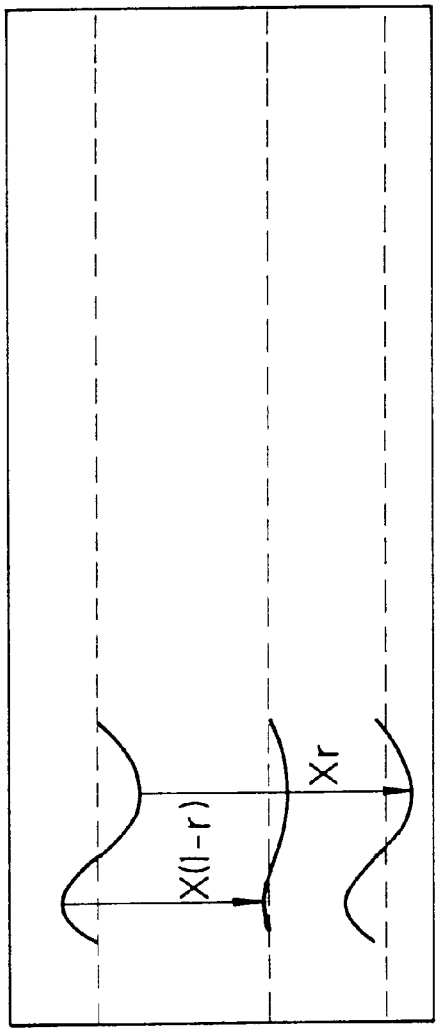
FIG. 11 is a view showing examples of monitored waveforms.

In this way, the monaural sound source signal of the fireworks is divided into the left and right stereo channel signals with the right channel dividing ratio r and left channel dividing ratio 1−r, as shown in FIG. 11. These stereo signals provide a sound image settled at the sound source mark 12 in FIG. 6, i.e., just over the fireworks 13. Accordingly, unlike the prior art, the mixing engineer can insert sounds in images while visually confirming the sounding direction of a sound source without depending on his intuition.

The left and right channel signals divided from the sound source signal are added to left and right sound signals of the image source itself by the adders 9 and 10, to provide final stereo signals.

The positioning of the sound source mark 12 may be done by displaying a still image of a frame of the image of FIG. 10, by manipulating the direction instruction key 11 on the still image to bring the sound source mark 12 just on the fireworks 13, and by starting images and sounds to insert the sounds in the images.

If an object (for example, a car) moves on a screen as time elapses, the mixing engineer may control the direction instruction key 11 while monitoring the object on the display unit 3, to position the sound source mark just on the object image. In this way, the sounding direction of a sound source can be moved according to the movement of an object image.

Figure 12:
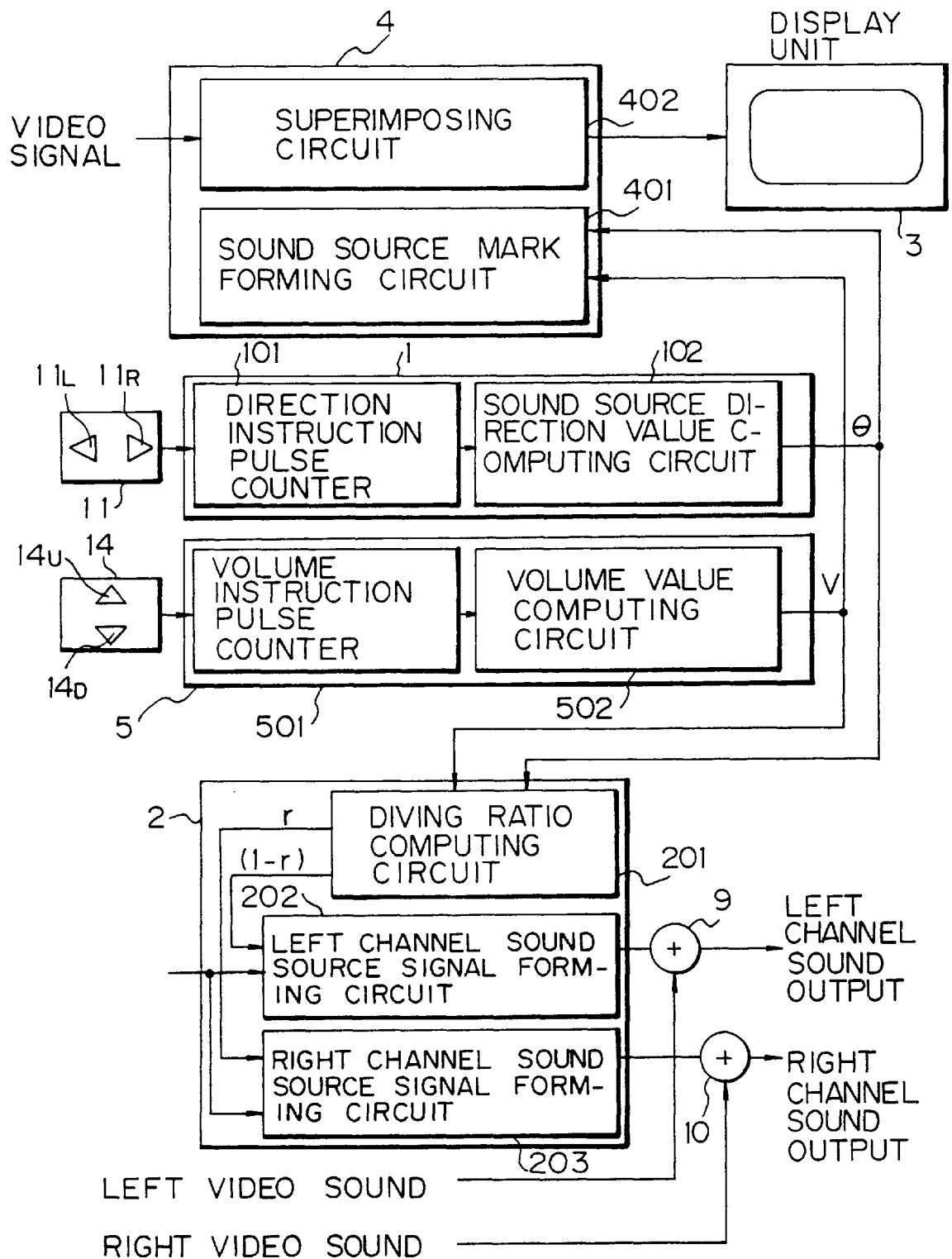
FIG. 12 is a view showing in detail the second embodiment of the present invention.

FIG. 12 shows the second embodiment in detail.

In addition to controlling the sounding direction of a sound source according to the embodiment of FIG. 5, the embodiment of FIG. 12 freely controls the volume of the sound source. Based on the arrangement of FIG. 5, the arrangement of FIG. 12 further employs a volume instruction key 14 and a volume setting unit 5. The same parts as those of FIG. 5 are represented with like numerals and their explanations are not repeated.

The volume setting unit 5 comprises a volume instruction pulse counter 501 for counting positive and negative volume instruction pulses provided by the volume instruction key 14, and a volume value computing circuit 502 for setting a volume value V of the sound source according to the number of the counted instruction pulses.

Figure 13:
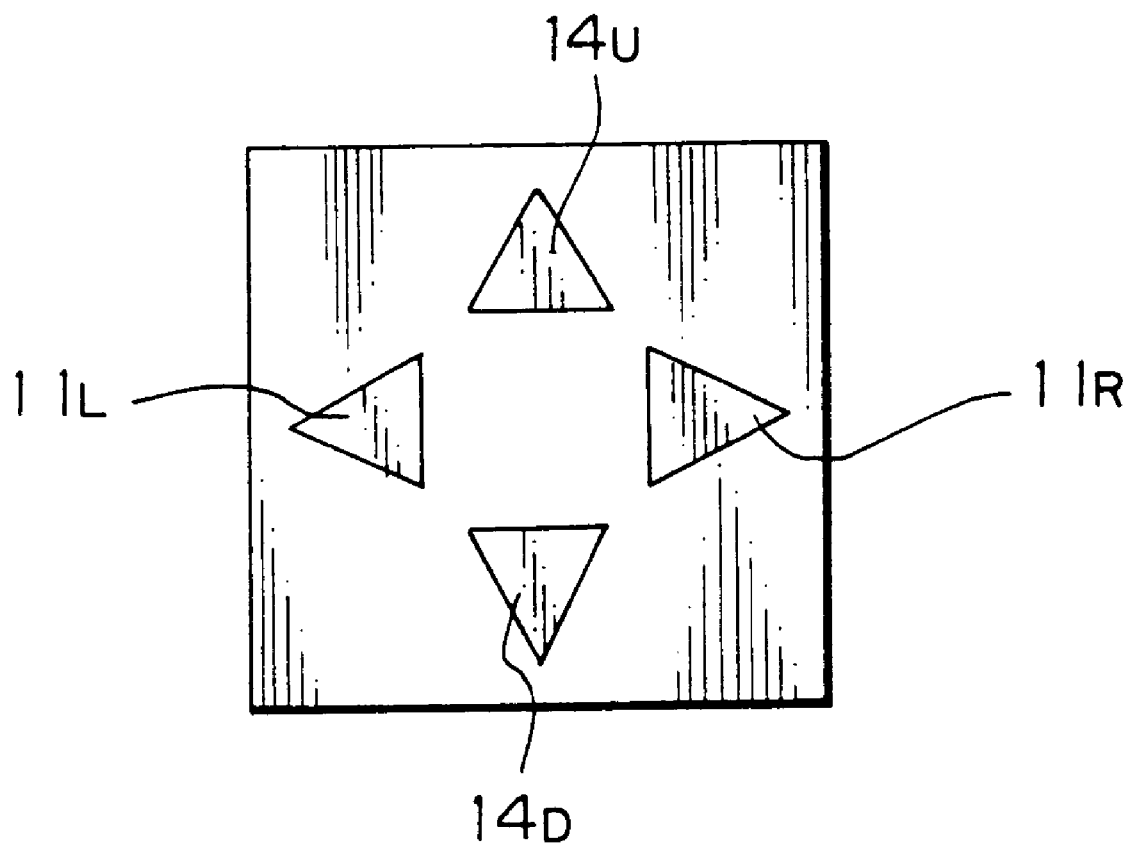
FIG. 13 is a view showing another example of a direction instruction button and a volume instruction button.

The volume instruction key 14 comprises an up button 14U and a down button 14D. While the up button 14U is being pushed, up pulses are successively provided. While the down button 14D is being pushed, down pulses are successively provided. The volume instruction key 14 and direction instruction key 11 may be formed in one unit as shown in FIG. 13.

When the volume instruction pulse counter 501 counts an up pulse, the volume value computing circuit 502 increments the volume value V by one, and when a down pulse is counted, decrements the volume value V by one, thereby setting the volume of the sound source in response to an instruction provided through the volume instruction key 14. The volume value V will be one of 0 to 32767 (16 bits). When V=0, the volume is nil, and when V=32767, the volume is at the maximum. The volume value V is sent to a sound source direction superimposing unit 4 and to a sound source signal dividing unit 2.

Similar to FIG. 5, a sound source mark forming circuit 401 of the sound source direction superimposing unit 4 forms a sound source mark 12 at a position of coordinate x corresponding to a sound source direction value θ, and in proportion to the volume value V provided by the volume value computing circuit 502, controls the width (thickness) m of the sound source mark 12, thereby visually and simultaneously displaying the direction and volume of the sound source.

When the maximum line width of the sound source mark 12 is 20 dots, a line width m for an optional volume value V is determined as follows:

$$m = (V/32767) \times 20 \text{ (dots)}$$

The sound source mark 12 thus obtained is superimposed over an image signal by superimposing circuit 4 and displayed on the display unit 3.

On the other hand, the sound source signal dividing unit 2 uses the volume value V and a right channel dividing ratio r to form sound source signals for left and right channels as follows:

right channel sound source signal={sound source signal× r}×{V/32767} left channel sound source signal={sound source signal× (1−r)}×{V/327671}

With these arrangements, a mixing engineer can insert sounds in images while monitoring not only the sounding direction of a sound source but also the volume of the sound source.

Figure 14B:
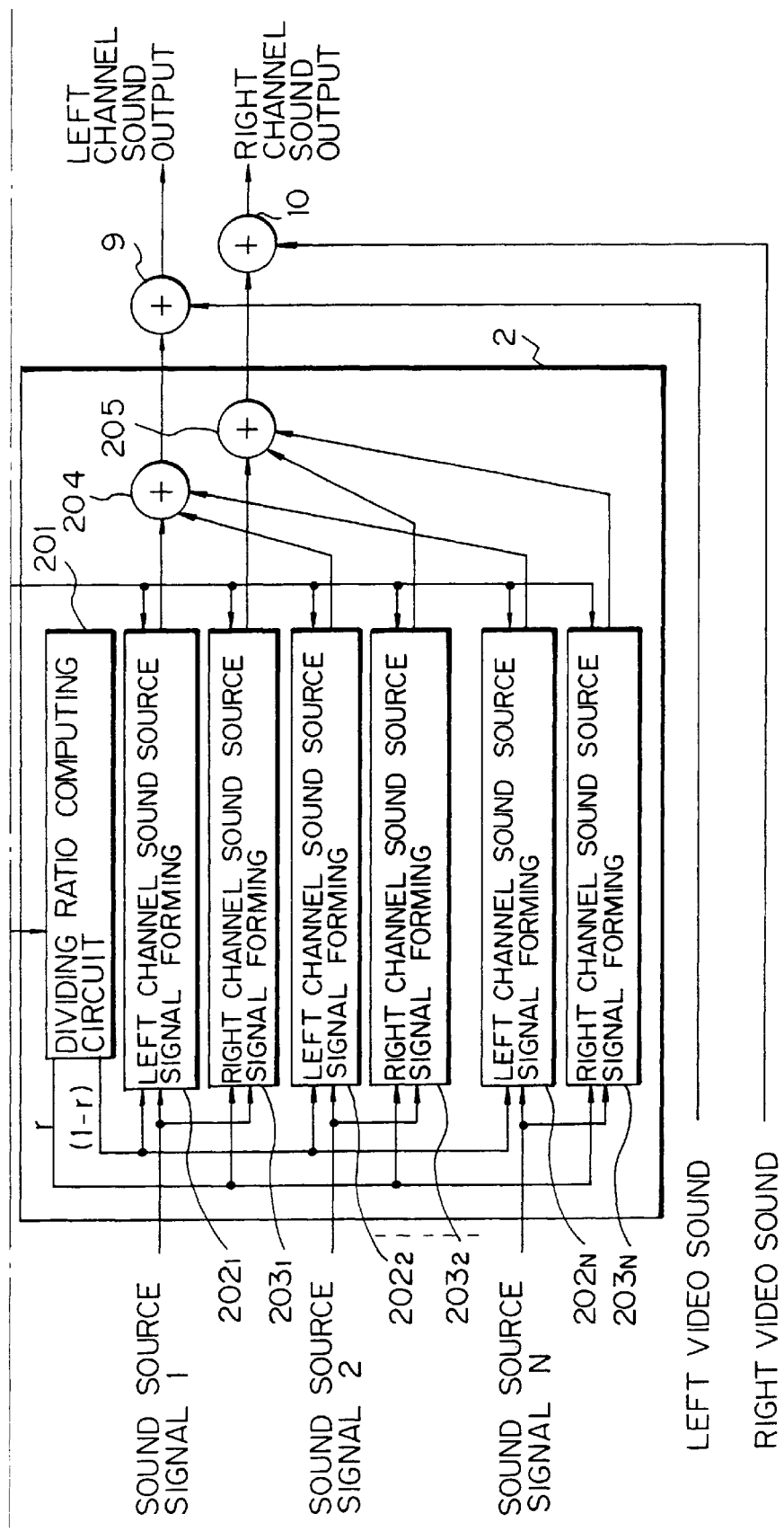
FIG. 14B is a view showing in detail the third embodiment of the present invention.

FIG. 14 shows the third embodiment in detail.

The embodiment of FIG. 14 simultaneously controls a plurality of sound sources. In addition to the arrangement of FIG. 12, the embodiment of FIG. 14 employs a sound source managing table 7 for storing set data (such as sound source numbers, sound source direction values θ, volume values V, and display colors), and left and right channel sound source signal forming circuits $202_1$ to $202_N$ and $203_1$ to $203_N$ for respective sound sources. Further, the construction of the sound source mark forming circuit 401a is slightly different from that of the circuit 401 in FIG. 12. The same parts as those of FIG. 8 are represented with like reference marks and their explanations are not repeated.

According to the embodiment of FIG. 14, a direction instruction key 11 and a volume instruction key 14 are operated to input, for each sound source, a sound source direction value θ, a volume value V, and the display color of a sound source mark. The input data for each sound source are stored in the sound source managing table 7 at a corresponding sound source address.

According to the set data of each sound source from the sound source managing table 7, a sound source direction superimposing unit 2 forms sound source marks $12_1$ to $12_N$ for the respective sound sources and displays the sound source marks on the display unit 3 at predetermined positions with given display colors. The left and right channel sound source signal forming circuits $202_1$ to $202_N$ and $203_1$ to $203_N$ in a sound source signal dividing unit 2 each divide a corresponding monaural sound source signal into left and right channel sound source signals according to corresponding sound source inserting data. Adders 204 and 205 add the signals to one another and provide left and right channel stereo signals.

Figure 15:
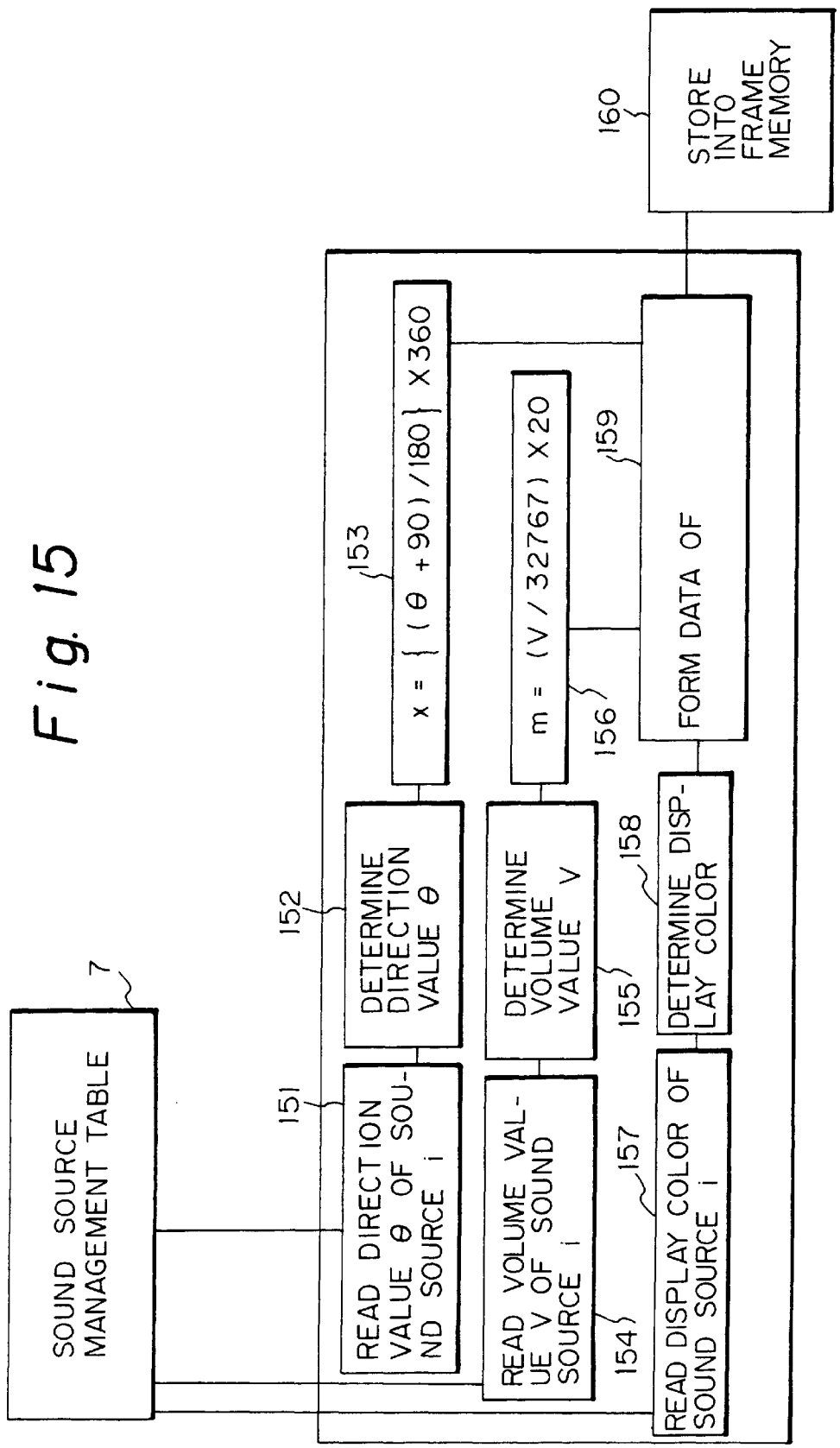
FIG. 15 is a view showing the process in the sound source mark forming circuit 401a in FIG. 13.

FIG. 15 is a diagram explaining an example of the operation of the sound source mark forming circuit 401a in FIG. 14. In FIG. 15, at steps 151, 154, and 155, the sound source direction value θ, the volume value V, and the display color of the sound source i are respectively read from the sound source management table 7. At steps 152, 155, and 158, the values θ and V and the display color are respectively determined. At step 153, based on the value θ, the coordinate X is calculated in accordance with the equation X={(θ+90)/180}×360. At step 156, based on the value V, the line width m is calculated in accordance with the equation m=(V/32767)×20. At step 159, based on the calculated values x and m and the determined display color, data of a rectangle having corners (x, 0), (x, 240), (x+m, 240), and (x+m, 0) and having the display color is obtained. Then, at step 160, the data is stored in a frame memory. The above operation is repeated for each i changing from 1 to N.

Figure 16:
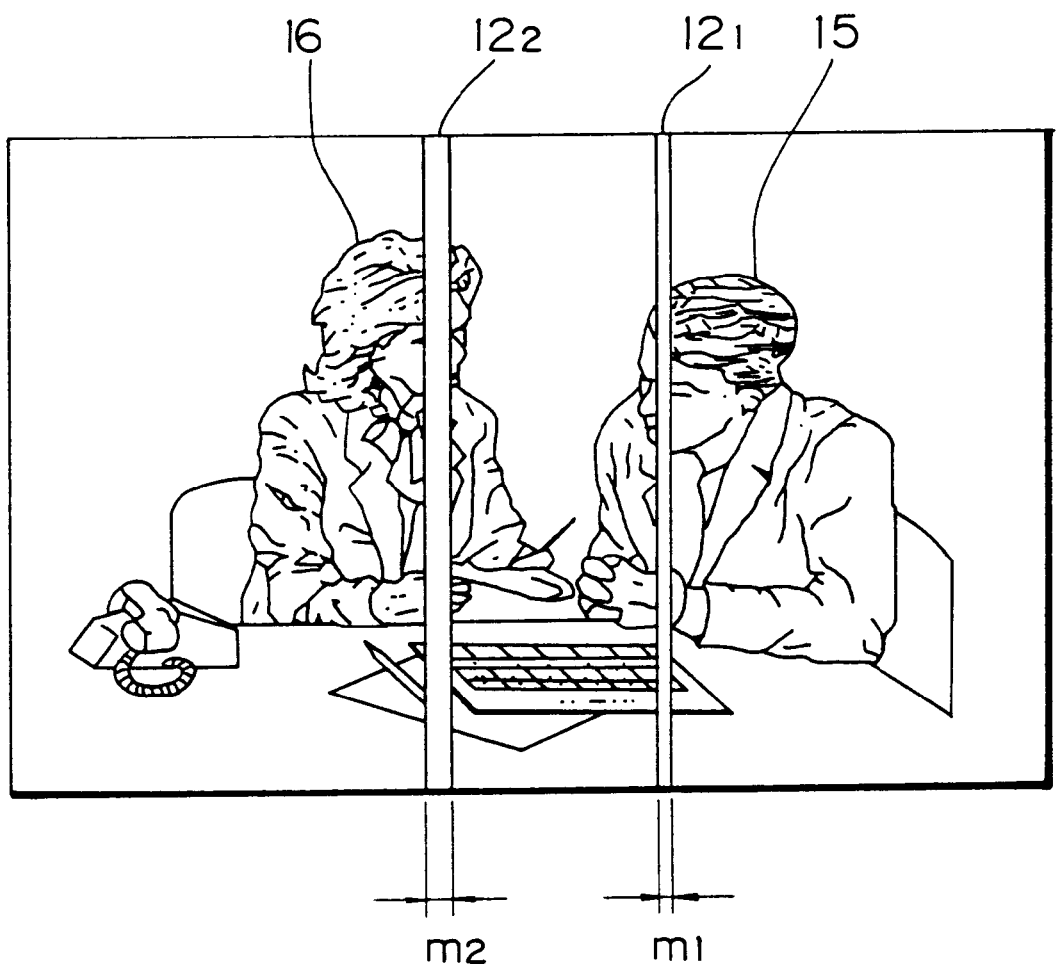
FIG. 16 is a view showing an example of a monitor screen displaying a plurality of sound sources.

FIG. 16 shows an example of an image monitored on the display unit 3 according to the embodiment of FIG. 15. Numeral $12_1$ denotes a blue sound source mark for a male 15, and $12_2$ is a red sound source mark for a female 16. Reference marks m1 and m2 represent line widths indicating the volumes of the sound source marks $12_1$ and $12_2$, respectively.

On the screen of FIG. 16, the male and female are talking. The voices of the two persons are recorded as separate sound sources for after-recording. A mixing engineer monitors the sound sources of the two persons as the sound source marks $12_1$ and $12_2$ on the screen, and adjusts and edits the directions and volumes of the sound sources. If a telephone rings in the scene, the sound of the phone will be a third sound source.

Figure 17:
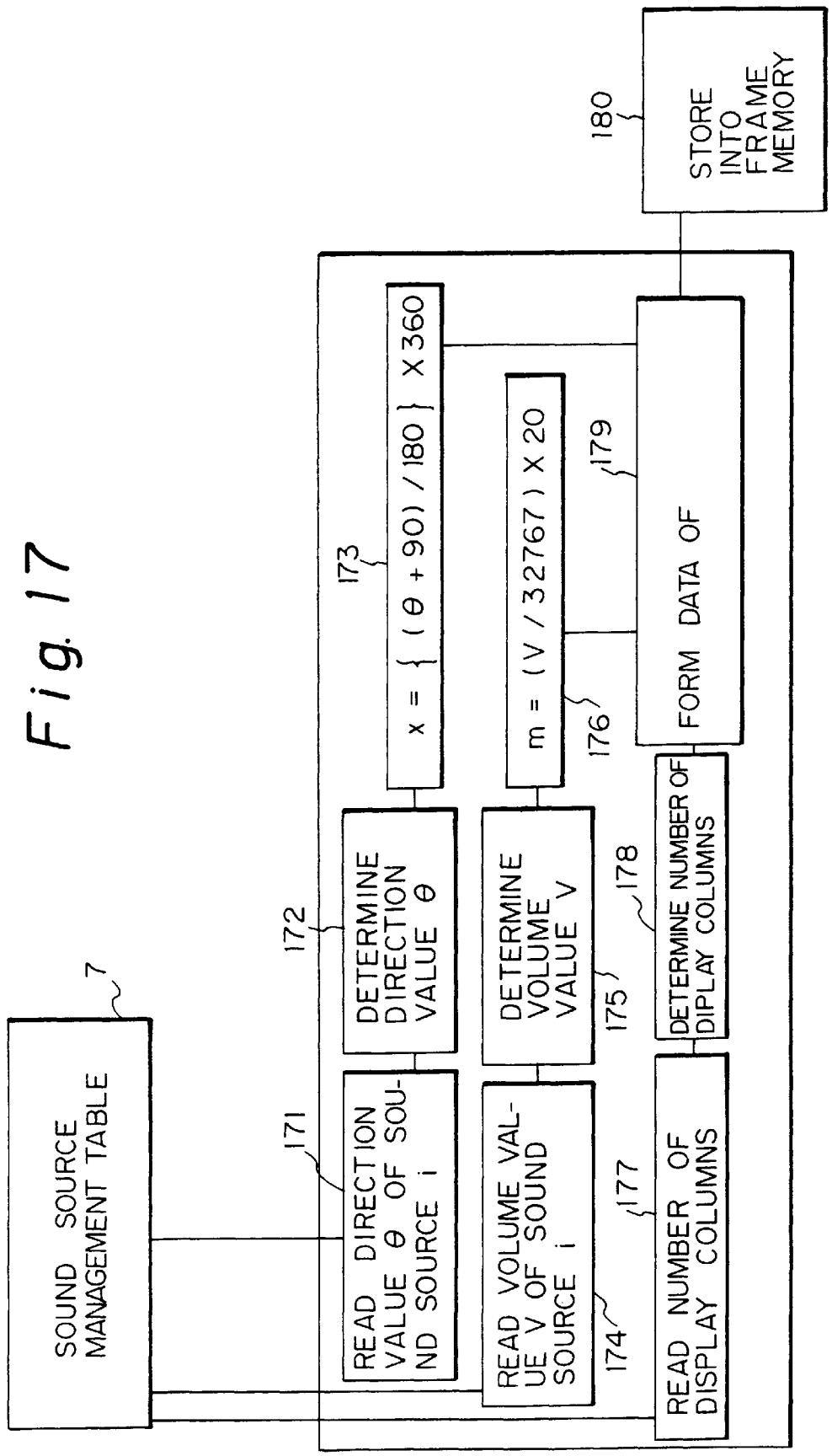
FIG. 17 is a view showing another example of the process in the sound mark forming circuit 401a in FIG. 13.

FIG. 17 is a diagram explaining another example of the operation of the sound source mark forming circuit 401a in FIG. 14. In FIG. 17, at steps 171, 174, and 177, the sound source direction value θ, the volume value V, and the number of display columns are respectively read from the sound source management table 7. At steps 172, 175, and 178, the values θ and V and the number k of displayed columns are respectively determined. At step 173, based on the value θ, the coordinate X is calculated in accordance with the equation X={(θ+90)/180}×360. At step 176, based on the value V, the line width m is calculated in accordance with the equation m=(V/32767)×20. At step 179, based on the calculated values X and m and the determined number k of the display columns, data of a rectangular area having corners [x, {(k−1)×24}], {x, (k×24)}, {x+m, (k×24)}, and [x+m, {(k−1×24}] is obtained. Then, at step 180, the data is stored in a frame memory. The above operation is repeated for each i changing from 1 to N.

Figure 18:
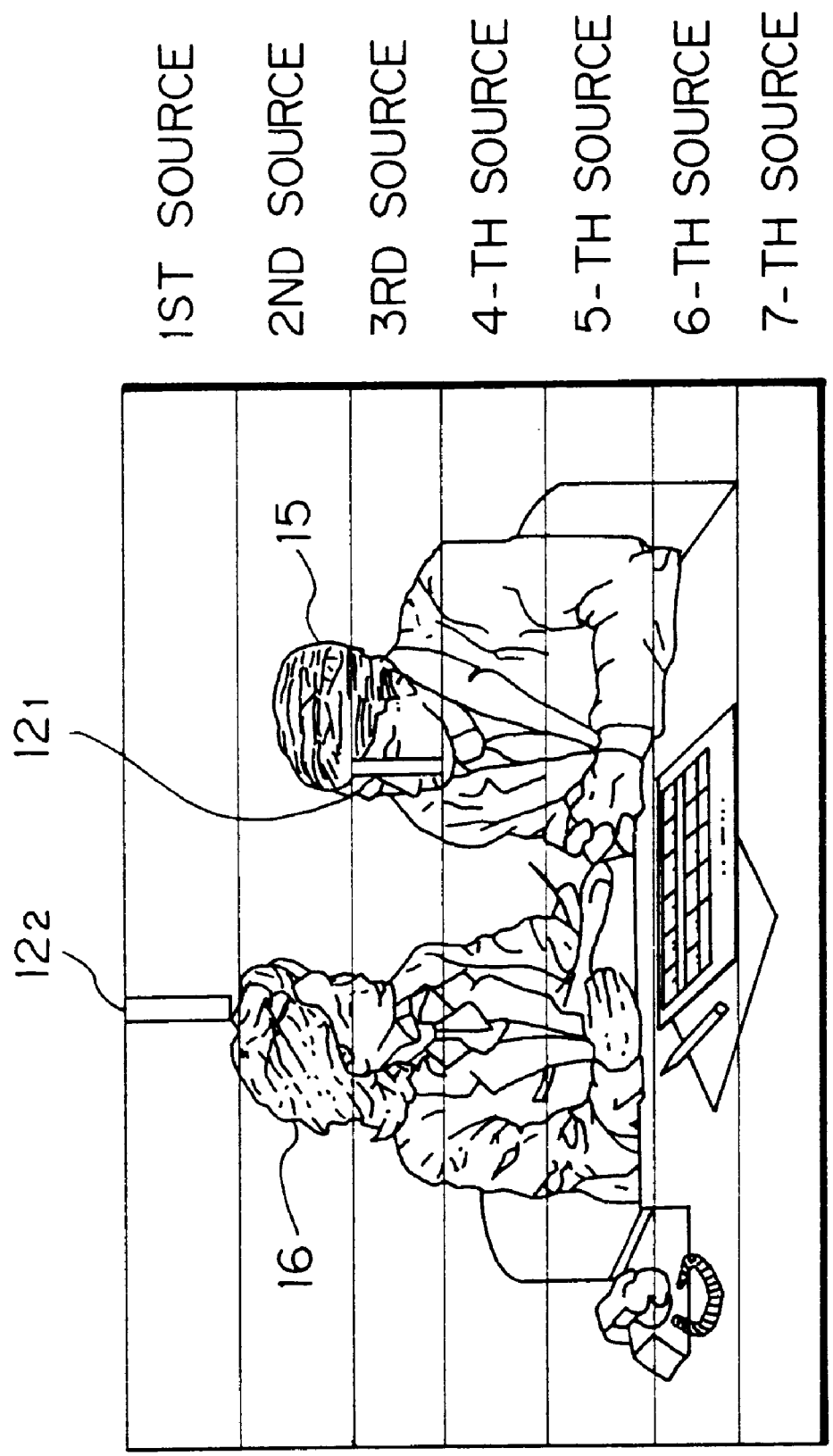
FIG. 18 is a view showing another example of a monitor screen displaying a plurality of sound sources.

FIG. 18 shows another example of the display screen according to the embodiment of FIG. 17. In the figure, the screen is divided into horizontal stripes, which correspond to sound sources at a proportion of 1:1. Sound source marks $12_1$ and $12_2$ are displayed in the corresponding stripe regions, so that the sound source marks do not overlap each other in the horizontal direction to more appropriately display themselves.

Figure 19A:
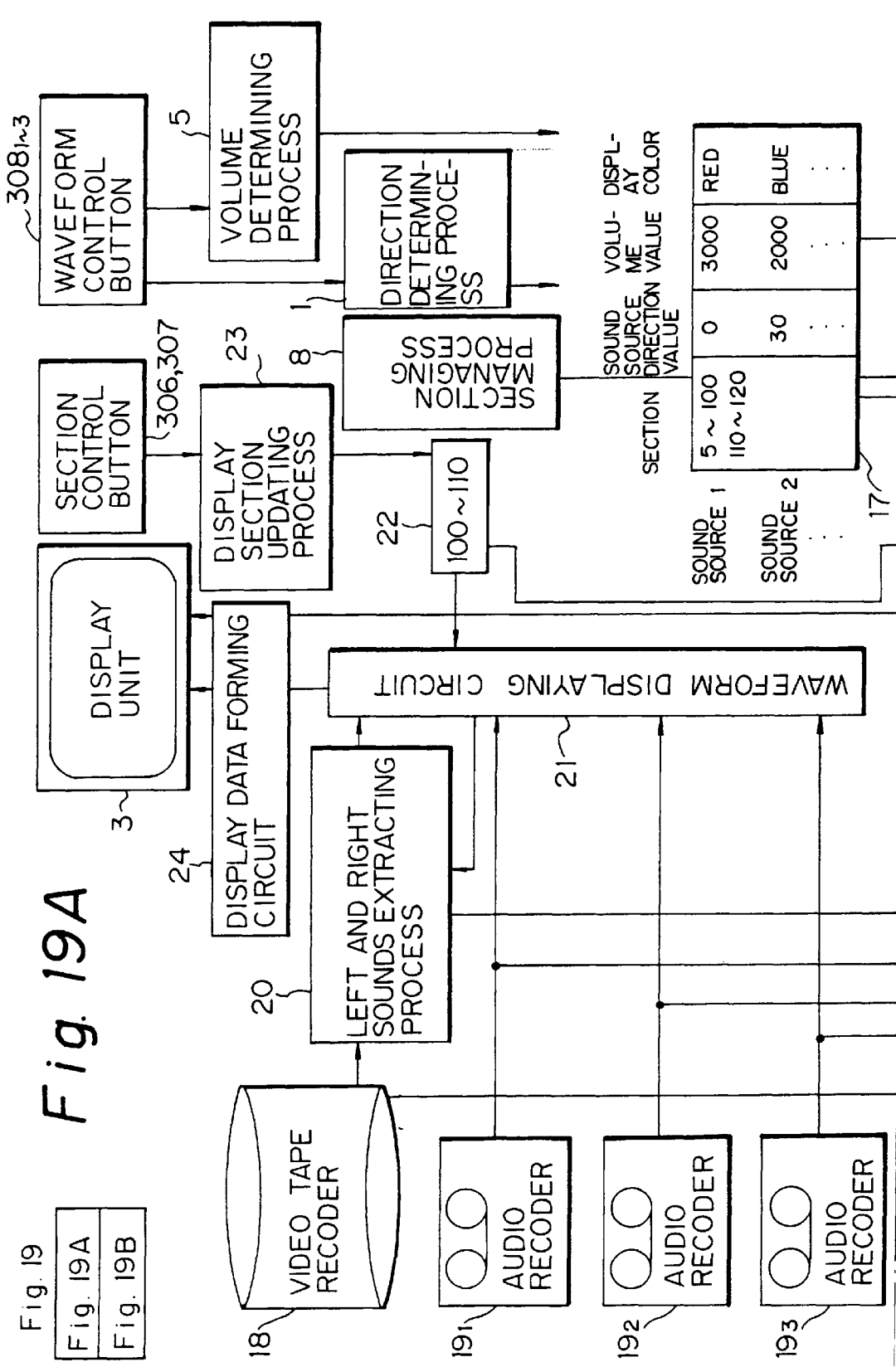
FIG. 19 including FIG. 19A
FIG. 19B is a view showing in detail the fourth embodiment of the present invention.
Figure 19B:
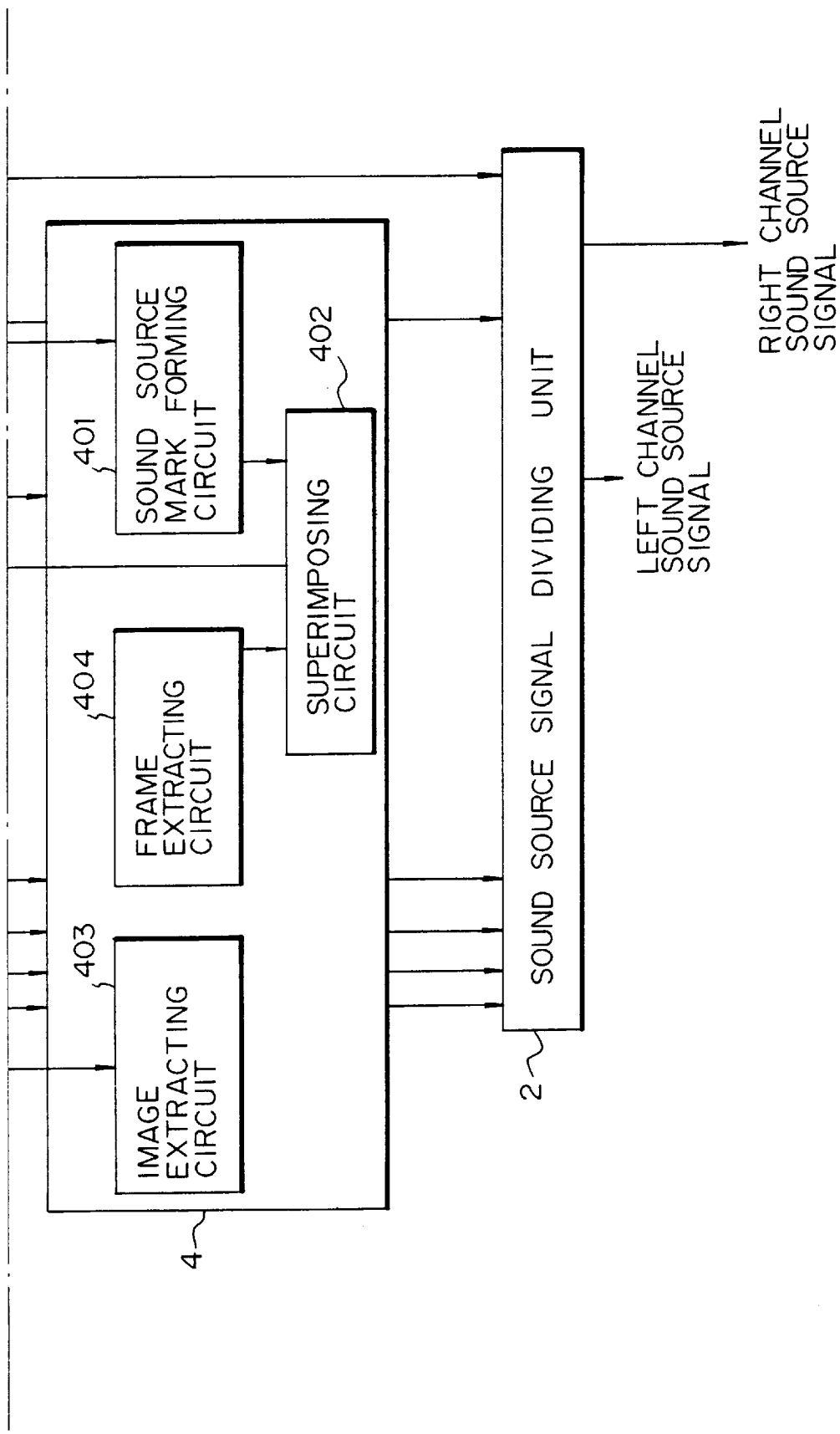

FIG. 19 shows the forth embodiment in detail.

Unlike the first to third embodiments that insert sound sources in real time to edit video tapes, the embodiment of FIG. 19 schedules the directions of sound sources before editing and inserts the sound sources according to the schedule.

To achieve this, a sound source managing table 7 of FIG. 19 has a section specifying region 17 for storing information for specifying video sections in which sounds are to be inserted, and a section managing unit 8 for writing video sections in which sounds are inserted into the section specifying region 17 according to section setting instructions.

In FIG. 19, numeral 18 denotes a video tape recorder for reproducing a video source, $19_1$ to $19_3$ are audio recorders for reproducing sound sources, 20 a left and right sound signals extracting circuit for separating stereo sound signals recorded on the video source into left and right channels, 21 a waveform displaying circuit for processing waveforms of the left and right video sounds of the video source and sound source signals and displaying them on a display unit 3, 22 a display section setting unit for setting a display section of a video signal to be displayed on the display unit 3, 23 a display section updating circuit for updating the display section, and 24 a display data forming circuit.

A sound source direction superimposing unit 4 incorporates an image extracting circuit 403 for extracting a video signal reproduced by the video tape recorder 18 and a frame extracting circuit 404 for separating and providing extracted images frame by frame.

FIG. 20 is a diagram explaining the operation of the display data forming circuit 24 shown in FIG. 19. In FIG. 20, at step 200, data of waveforms generated by the waveform displaying circuit 21 is written into a frame memory 204. At step 201, the superimposed data generated by the superimposing circuit 402 is written into a frame memory. At step 202, the data is compressed to be ¹⁄₁₂ with respect to the vertical direction and to the horizontal direction, respectively. At step 203, the compressed data is written into the frame memory 204.

Figure 21:
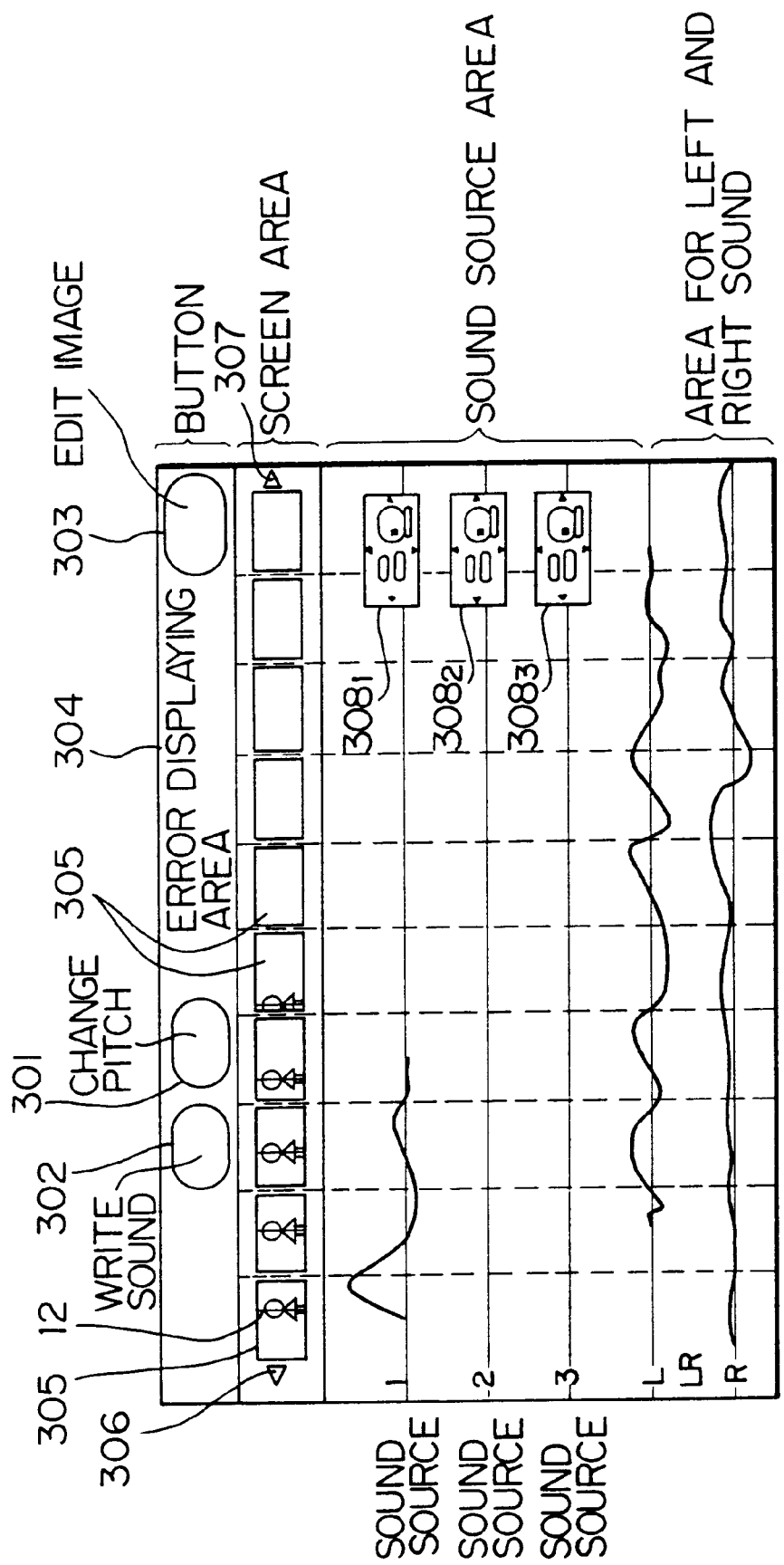
FIG. 21 is a view showing an example of a sound editing screen.

FIG. 21 shows an editing screen realized on the display unit 3 according to the embodiment of FIG. 19. The top area of the editing screen is for buttons including a pitch changing button 301 for specifying a display pitch of frames, a write instruction button 302 for writing a sound source into left and right channels, a button 303 for switching to another process, an error display region 304, etc.

Below the button area, there is a screen area. According to this embodiment, ten small screens 305 are arranged from left to right in time series for displaying 10 reduced frames of images. Each of the small screens 305 displays a corresponding one of 10 consecutive frames of images picked up by the frame extracting circuit 404 of FIG. 13. On each of the ten screen 305, a mixing engineer sequentially sets a sound source mark 12 on a target image at which sounds are inserted.

Triangle buttons 306 and 307 disposed at left and ends of the small screens 305 are section control buttons for shifting a section of images to the next one.

Figure 22:
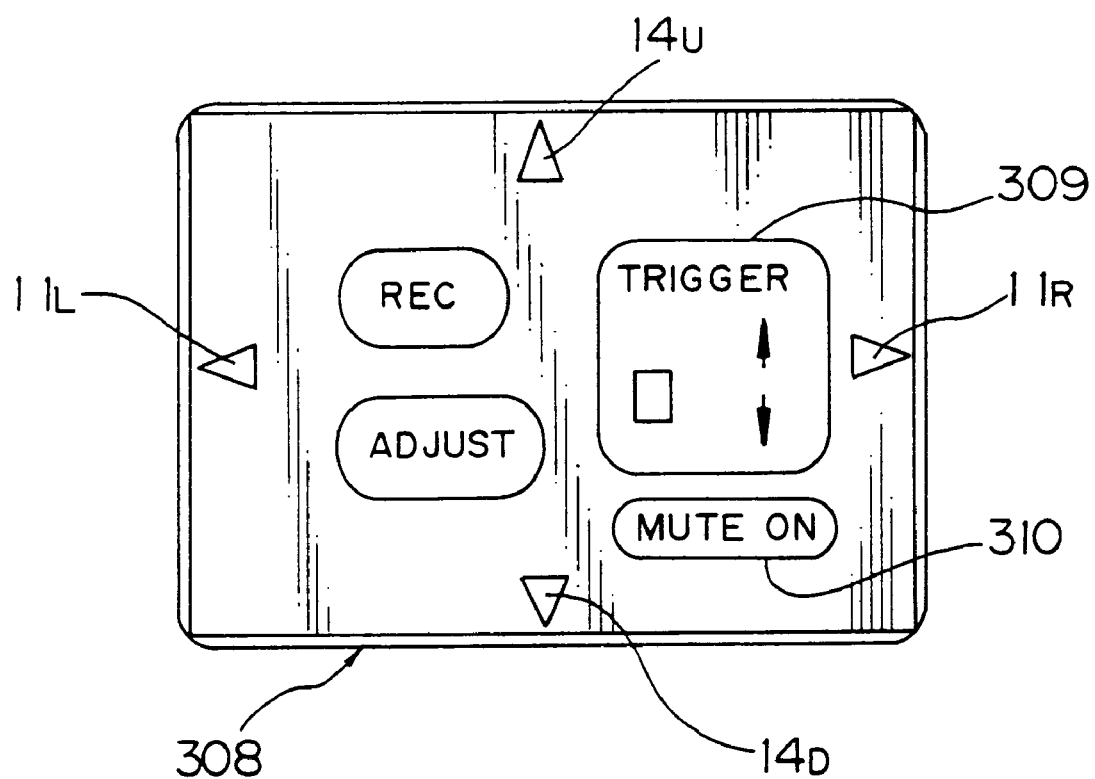
FIG. 22 is a view showing a waveform control panel.

Below the screen area is a sound source area for displaying waveforms of respective sound sources on respective sound source lines. Rectangular panels $308_1$ to $308_3$ disposed at right ends of the sound source regions control waveforms of the sound sources. FIG. 22 is an enlarged view showing one of the waveform control panels. The waveform control panel 308 includes a trigger button 309 for instructing the timing of sound source recording, a mute button 310 for determining whether or not a corresponding sound is muted, direction instruction buttons 11L and 11R for instructing the sounding directions of a sound source, and volume up/down buttons 14U and 14D for controlling the volume of the sound source. The buttons disposed in the display screens of FIGS. 21 and 22 are controlled with, for example, a mouse.

The lowest area of the display screen of FIG. 21 shows the waveforms of left and right sound signals of a video source picked up by the left and right sounds extracting circuit 20 of FIG. 19.

The display section setting unit 22 of FIG. 19 stores frame information, i.e., frame numbers of 10 image frames displayed in the screen area of FIG. 21. The frame numbers are positive numbers starting from 0.

When the frame control buttons 306 and 307 disposed at the left and right ends of the screen area are pushed, the display frames are shifted. The left and right sounds extracting unit 20 picks up sound signals of a corresponding frame screen out of the video tape recorder 18 and writes the left and right sound signals in the lowest area. At the same time, sounds of a sound source to be inserted in the display section are picked up from the audio recorders $19_1$ to $19_3$, and the waveforms of the picked up sounds are displayed on the sound source lines in the sound source area.

The image extracting circuit 403 and frame extracting circuit 404 pick up images of a display section frame by frame out of the video tape recorder 18, and for each frame, prepares a sound source mark 12 indicating the sounding direction of the sound source similar to the embodiments of the first to third inventions, and superimposes the sound source mark on an image in the corresponding small screen. Each of the small screens may be the same as any one of those shown in FIGS. 10, 16, and 18.

When the direction instruction buttons 11R and 11L (FIG. 22) on any one of the waveform control panels $308_1$ to $308_3$ for the sound sources 1, 2, and 3 are pushed, a sound source direction value θ of the corresponding sound source in the sound source managing table 7 is updated. When the volume instruction buttons 14U and 14D are pushed, a volume value V of the corresponding sound source in the sound source managing table 7 is updated. In this way, the sound source direction value θ and volume value V can be freely set for each small screen.

When the sound write button 302 in the button area of FIG. 21 is pushed to start a sound inserting process, a sound signal is picked up from the video tape recorder 18, sounds from the audio recorders $19_1$ to $19_3$ are used as sound sources which are inserted in respective frames according to insertion data of the respective sound sources stored in the sound source managing table 7, and left and right stereo signals are provided from the sound source signal dividing unit 2.

In the above embodiments, each sound source mark 12 is a vertical line. The sound source mark 12 may have another shape. Also, the volume of a sound source indicated as the width (thickness) of a vertical line serving as the sound source mark 12 may be expressed with a color or light intensity.

As clearly explained above, the first embodiment edits a sound source to be inserted in an image while visually monitoring the sounding direction of the sound source. Unlike a prior art that requires special skill, the invention enables anyone to easily and correctly edit sounds.

The second embodiment edits sounds to be inserted in images while visually displaying not only the sounding direction of a sound source but also the volume of the sound source, to more correctly edit the sounds.

The third embodiment visually displays the directions and volumes of a plurality of sound sources, to further improve operability.

The fourth embodiment specifies an image section to which sounds are to be inserted and schedules the timing of sound insertion of a plurality of sound sources on a screen, to thereby correctly and flexibly edit the sounds.

We claim:

1. A sound editing apparatus for inserting sounds in a video medium by after-recording, comprising:

a sound source direction setting unit for setting a sounding direction of a sound source according to a sound source direction instruction input;

a sound source signal dividing unit for dividing a monaural sound source signal into left- and right-channel stereo signals according to the sounding direction of the sound source set by the sound source direction setting unit;

a display unit for reproducing images from the video medium and displaying the images in which sounds are to be inserted;

a sound source direction superimposing unit for superimposing a predetermined mark, which indicates the sounding direction of the sound source set by the sound source direction setting unit, on the images displayed on the display unit;

a volume setting unit (5) for setting a volume of the sound source according to a volume instruction input; and a volume superimposing unit (6) for adjusting a condition of the sound source mark displayed on the display unit, according to the set volume.

2. A sound editing apparatus for inserting sounds in a video medium by after-recording, comprising:

a sound source direction setting unit for setting a sounding direction of a sound source according to a sound source direction instruction input;

a sound source signal dividing unit for dividing a monaural sound source signal into left- and right-channel stereo signals according to the sounding direction of the sound source set by the sound source direction setting unit;

a display unit for reproducing images from the video medium and displaying the images in which sounds are to be inserted;

a sound source direction superimposing unit for superimposing a predetermined mark, which indicates the sounding direction of the sound source set by the sound source direction setting unit, on the images displayed on the display unit;

a sound source managing table for storing information about positions and volumes of a plurality of sound sources, sounds from the sound sources being edited according to the information stored in the sound source managing table.

3. A sound editing apparatus for inserting sounds in a video medium by after-recording, comprising:

a sound source direction setting unit for setting a sounding direction of a sound source according to a sound source direction instruction input;

a sound source signal dividing unit for dividing a monaural sound source signal into left- and right-channel stereo signals according to the sounding direction of the sound source set by the sound source direction setting unit;

a display unit for reproducing images from the video medium and displaying the images in which sounds are to be inserted;

a sound source direction superimposing unit for superimposing a predetermined mark, which indicates the sounding direction of the sound sou set by the sound source direction setting unit, on the images displayed on the display unit; and a sound source managing table (7) for storing information about positions and volumes of a plurality of sound sources, sounds from the sound sources being edited according to the information stored in the sound source managing table, wherein the sound source managing table involves a section specifying region for storing information for specifying a video section in which sounds are to be inserted, and a section managing unit for writing the video section in which sounds are inserted into the section specifying region according to a section specifying input, and wherein the video section in which sounds of the plurality of sound sources are to be inserted is specified, and timing of inserting the sounds is scheduled on the display unit.

4. A sound editing apparatus as claimed in claim 1, further comprising:

a sound source managing table for storing information about positions and volumes of a plurality of sound sources, sounds from the sound sources being edited according to the information stored in the sound source managing table.

5. A sound editing apparatus according to claim 4, wherein the sound source managing table involves a section specifying region for storing information for specifying a video section in which sounds are to be inserted, and a section managing unit for writing the video section in which sounds are inserted into the section specifying region according to a section specifying input, wherein the video section in which sounds of the plurality of sound sources are to be inserted is specified, and timing of inserting the sounds are scheduled on the display unit.

* * * * *